United States Patent
Breed et al.

(10) Patent No.: US 6,324,453 B1
(45) Date of Patent: Nov. 27, 2001

(54) METHODS FOR DETERMINING THE IDENTIFICATION AND POSITION OF AND MONITORING OBJECTS IN A VEHICLE

(75) Inventors: David S. Breed, Boonton Township, Morris County, NJ (US); Wilbur E. DuVall, Kimberling City, MO (US); Wendell C. Johnson, San Diego, CA (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

(21) Appl. No.: 09/476,255

(22) Filed: Dec. 30, 1999

Related U.S. Application Data
(60) Provisional application No. 60/114,507, filed on Dec. 31, 1998.

(51) Int. Cl.[7] ............................. B60R 21/32; G06K 9/00
(52) U.S. Cl. ............................. 701/45; 701/46; 382/104; 382/106; 180/169; 280/730.1; 367/8; 73/596
(58) Field of Search ............................. 701/45; 382/100, 382/103, 278; 340/438; 280/735, 734; 356/376; 348/77

(56) References Cited

U.S. PATENT DOCUMENTS

| | | | |
|---|---|---|---|
| 4,648,052 | 3/1987 | Friedman et al. | 364/550 |
| 4,720,189 | 1/1988 | Heynen et al. | 351/210 |
| 4,836,670 | 6/1989 | Hutchinson | 351/210 |
| 4,881,270 | 11/1989 | Knecht et al. | 382/17 |
| 4,906,940 | 3/1990 | Greene et al. | 382/16 |
| 4,950,069 | 8/1990 | Hutchinson | 351/210 |
| 5,003,166 | 3/1991 | Girod | 250/201.4 |
| 5,008,946 | 4/1991 | Ando | 382/2 |
| 5,071,160 | 12/1991 | White et al. | 280/735 |
| 5,074,583 | 12/1991 | Fujita et al. | 280/735 |
| 5,118,134 | 6/1992 | Mattes et al. | 280/735 |
| 5,181,254 | 1/1993 | Schweizer et al. | 382/1 |
| 5,193,124 | 3/1993 | Subbarao | 382/41 |
| 5,214,744 | 5/1993 | Schweizer et al. | 395/21 |
| 5,235,339 | 8/1993 | Morrison et al. | 342/159 |
| 5,298,732 | 3/1994 | Chen | 250/203.4 |

(List continued on next page.)

FOREIGN PATENT DOCUMENTS 3-42337    2/1991   (JP) ........................ 180/273

OTHER PUBLICATIONS

"Analysis of Hidden Units in a Layered Network Trained to Classify Sonar Targets", R. Paul Gorman, et al., Neural Networks, vol. 1, pp. 75–89, 1988.

(List continued on next page.)

Primary Examiner—Tan Nguyen
Assistant Examiner—Tuan C To
(74) Attorney, Agent, or Firm—Brian Roffe

(57) ABSTRACT

A vehicle interior monitoring system to identify, locate and monitor occupants, including their parts, and other objects in the passenger compartment and objects outside of a motor vehicle, such as an automobile or truck, by illuminating the contents of the vehicle and objects outside of the vehicle with electromagnetic, and specifically infrared, radiation and using one or more lenses to focus images of the contents onto one or more arrays of charge coupled devices (CCD arrays). Outputs from the CCD arrays are analyzed by appropriate computational means employing trained pattern recognition technologies, to classify, identify or locate the contents or external objects. In general, the information obtained by the identification and monitoring system is used to affect the operation of some other system in the vehicle. When system is installed in the passenger compartment of an automotive vehicle equipped with an airbag, the system determines the position of the vehicle occupant relative to the airbag and disables deployment of the airbag if the occupant is positioned so that he/she is likely to be injured by the deployment of the airbag.

42 Claims, 13 Drawing Sheets

U.S. PATENT DOCUMENTS

| | | | |
|---|---|---|---|
| 5,305,012 | | 4/1994 | Faris ........................................... 345/7 |
| 5,330,226 | * | 7/1994 | Gentry et al. ........................... 280/735 |
| 5,390,136 | | 2/1995 | Wang ..................................... 364/754 |
| 5,528,698 | * | 6/1996 | Kamei et al. ........................... 382/100 |
| 5,653,462 | | 8/1997 | Breed et al. ........................... 280/735 |
| 5,821,633 | * | 10/1998 | Burke et al. ........................... 307/10.1 |
| 5,829,782 | | 11/1998 | Breed et al. ........................... 280/735 |
| 5,835,613 | | 11/1998 | Breed et al. ........................... 382/100 |
| 5,845,000 | | 12/1998 | Breed et al. ........................... 382/100 |
| 5,848,802 | * | 12/1998 | Breed et al. ........................... 280/735 |
| 5,943,295 | * | 8/1999 | Varga et al. ............................ 367/99 |
| 5,954,360 | * | 9/1999 | Griggs, III et al. ................... 280/735 |
| 6,005,958 | * | 12/1999 | Farmer et al. ......................... 382/103 |
| 6,007,095 | * | 12/1999 | Stanley ................................... 280/735 |
| 6,020,812 | * | 2/2000 | Thompson et al. ................... 340/438 |
| 6,027,138 | * | 2/2000 | Tanaka et al. ......................... 280/735 |
| 6,029,105 | * | 2/2000 | Schweizer .............................. 701/45 |
| 6,116,640 | * | 9/2000 | Tanaka et al. ......................... 280/735 |

OTHER PUBLICATIONS

Learned Classification of Sonar Targets Using a Massively Parallel Network, R. Paul Gorman et al., IEEE Transactions on Acoustics, Speech and Signal Processing, vol. 36, No. 7, Jul., 1988, pp. 1135–1140.

"How Airbags Work", David S. Breed, Presented at the Canadian Association of Road Safety Professionals, Oct. 19, 1992–Oct. 20, 1992.

Intelligent System for Video Monitoring of Vehicle Cockpit, S. Boverie et al., SAE Paper No. 980613, Feb., 1998.

Omnidirectional Vision Sensor for Intelligent Vehicles, T. Ito et al., 1998 IEEE International Conference on Intelligent Vehicles, pp. 365–370, 1998.

A 256×256 CMOS Brightness Adaptive Imaging Array with Column–Paralel Digital Output, C. Sodini et al., 1998 IEEE International Conference on Intelligent Vehicles, 1998, pp. 347–352.

* cited by examiner

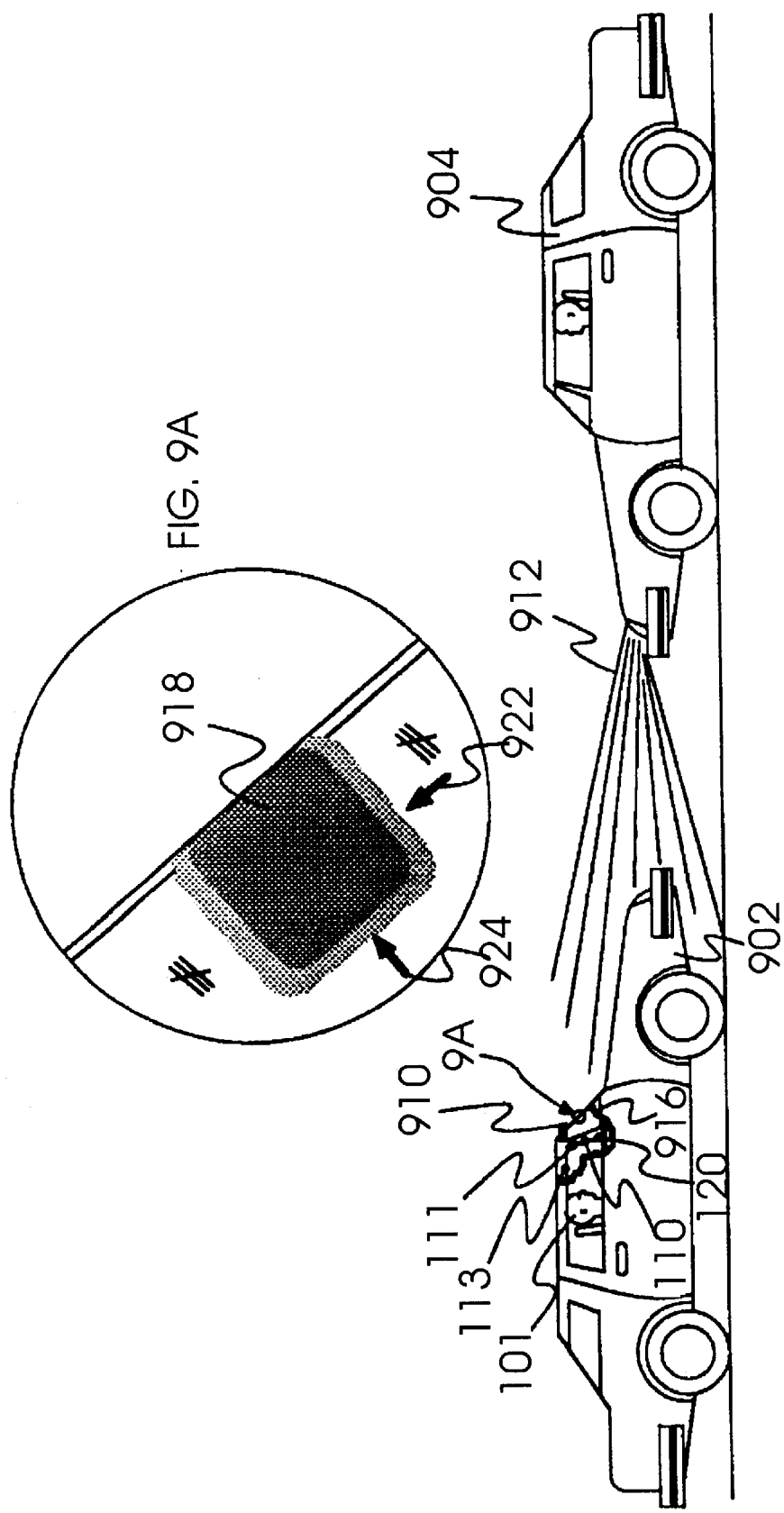

METHODS FOR DETERMINING THE IDENTIFICATION AND POSITION OF AND MONITORING OBJECTS IN A VEHICLE

CROSS REFERENCE TO RELATED APPLICATIONS

This application claims priority under 35 U.S.C. §119(e) of U.S. provisional patent application Ser. No. 60/114,507 filed Dec. 31, 1998.

This application is related to U.S. patent application Ser. No. 07/878,571 filed May 5, 1992, now abandoned, U.S. patent application Ser. No. 08/040,978 filed Mar. 31, 1993, now abandoned, U.S. patent application Ser. No. 08/505,036 filed Jul. 21, 1995, now U.S. Pat. No. 5,653,462, U.S. patent application Ser. No. 08/247,760 filed May 23, 1994, now abandoned, U.S. patent application Ser. No. 08/640,068 filed Apr. 30, 1996, now U.S. Pat. No. 5,829,782, and U.S. patent application Ser. No. 08/239,978 filed May 9, 1994, now U.S. Pat. No. 5,829,782, all of which incorporated by reference herein.

This application is also related to U.S. Pat. Nos. 5,835,613 and 5,845,000 and U.S. patent application Ser. Nos. 09/193,209 and 09/200,614, all of which are incorporated by reference herein.

BACKGROUND OF THE INVENTION

1. Prior Art on Out of Position Occupants and Rear Facing Child Seats

Whereas thousands of lives have been saved by airbags, a large number of people have also been injured, some seriously, by the deploying airbag, and over 100 people have now been killed. Thus, significant improvements need to be made to airbag systems. As discussed in detail in U.S. Pat. No. 5,653,462 referenced above, for a variety of reasons vehicle occupants may be too close to the airbag before it deploys and can be seriously injured or killed as a result of the deployment thereof. Also, a child in a rear facing child seat that is placed on the right front passenger seat is in danger of being seriously injured if the passenger airbag, deploys. For these reasons and, as first publicly disclosed in Breed, D. S. "How Airbags Work" presented at the International Conference on Seatbelts and Airbags in 1993, in Canada, occupant position sensing and rear facing child seat detection systems are required.

Initially, these systems will solve the out-of-position occupant and the rear facing child seat problems related to current airbag systems and prevent unneeded airbag deployments when a front seat is unoccupied. However, airbags are now under development to protect rear seat occupants in vehicle crashes and all occupants in side impacts. A system will therefore be needed to detect the presence of occupants, determine if they are out-of-position and to identify the presence of a rear facing child seat in the rear seat. Future automobiles are expected to have eight or more airbags as protection is sought for rear seat occupants and from side impacts. In addition to eliminating the disturbance and possible harm of unnecessary airbag deployments, the cost of replacing these airbags will be excessive if they all deploy in an accident needlessly.

Inflators now exist which will adjust the amount of gas flowing to the airbag to account for the size and position of the occupant and for the severity of the accident. The vehicle identification and monitoring system (VIMS) discussed in U.S. Pat. No. 5,829,782 will control such inflators based on the presence and position of vehicle occupants or of a rear facing child seat. As discussed more fully below, the instant invention is an improvement on that VIMS system and uses an advanced optical system comprising one or more CCD (charge coupled device) or CMOS arrays and particularly active pixel arrays plus a source of illumination preferably combined with a trained neural network pattern recognition system.

Others have observed the need for an occupant out-of-position sensor and several methods have been disclosed in U.S. patents for determining the position of an occupant of a motor vehicle. Each of these systems, however, has significant limitations. For example, in White et al. (U.S. Pat. No. 5,071,160), a single acoustic sensor and detector is described and, as illustrated, is mounted lower than the steering wheel. White et al. correctly perceive that such a sensor could be defeated, and the airbag falsely deployed, by an occupant adjusting the control knobs on the radio and thus they suggest the use of a plurality of such sensors.

Mattes et al. (U.S. Pat. No. 5,118,134) describe a variety of methods of measuring the change in position of an occupant including ultrasonic, active or passive infrared and microwave radar sensors, and an electric eye. The sensors measure the change in position of an occupant during a crash and use that information to access the severity of the crash and thereby decide whether or not to deploy the airbag. They are thus using the occupant motion as a crash sensor. No mention is made of determining the out-of-position status of the occupant or of any of the other features of occupant monitoring as disclosed in one or more of the above cross-referenced patents and patent applications. It is interesting to note that nowhere does Mattes et al. discuss how to use active or passive infrared to determine the position of the occupant. As pointed out in one or more of the above cross-referenced patents and patent applications, direct occupant position measurement based on passive infrared is probably not possible and, until very recently, was very difficult and expensive with active infrared requiring the modulation of an expensive GaAs infrared laser. Since there is no mention of these problems, the method of use contemplated by Mattes et al. must be similar to the electric eye concept where position is measured indirectly as the occupant passes by a plurality of longitudinally spaced-apart sensors.

The object of an occupant out-of-position sensor is to determine the location of the head and/or chest of the vehicle occupant relative to the airbag since it is the impact of either the head or chest with the deploying airbag which can result in serious injuries. Both White et al. and Mattes et al. describe only lower mounting locations of their sensors in front of the occupant such as on the dashboard or below the steering wheel. Both such mounting locations are particularly prone to detection errors due to positioning of the occupant's hands, arms and legs. This would require at least three, and preferably more, such sensors and detectors and an appropriate logic circuitry which ignores readings from some sensors if such readings are inconsistent with others, for the case, for example, where the driver's arms are the closest objects to two of the sensors.

White et al. also describe the use of error correction circuitry, without defining or illustrating the circuitry, to differentiate between the velocity of one of the occupant's hands as in the case where he/she is adjusting the knob on the radio and the remainder of the occupant. Three ultrasonic sensors of the type disclosed by White et al. might, in some cases, accomplish this differentiation if two of them indicated that the occupant was not moving while the third was indicating that he or she was. Such a combination, however, would not differentiate between an occupant with both hands and arms in the path of the ultrasonic transmitter at such a location that they were blocking a substantial view of the occupant's head or chest. Since the sizes and driving positions of occupants are extremely varied, it is now believed that pattern recognition systems and preferably trained pattern recognition systems, such as neural networks, are required when a clear view of the occupant, unimpeded by his/her extremities, camiot be guaranteed.

Fujita et al., in U.S. Pat. No. 5,074,583, describe another method of determining the position of the occupant but do not use this information to suppress deployment if the occupant is out-of-position. In fact, the closer the occupant gets to the airbag, the faster the inflation rate of the airbag is according to the Fujita et al. patent, which thereby increases the possibility of injuring the occupant. Fujita et al. do not measure the occupant directly but instead determine his or her position indirectly from measurements of the seat position and the vertical size of the occupant relative to the seat (occupant height). This occupant height is determined using an ultrasonic displacement sensor mounted directly above the occupant's head.

As discussed above, the optical systems described herein are also applicable for many other sensing applications both inside and outside of the vehicle compartment such as for sensing crashes before they occur as described in U.S. patent application Ser. No. 08/239,978 cross-referenced above, for a smart headlight adjustment system and for a blind spot monitor.

2. Definitions

The use of pattern recognition is central to the instant invention as well as to one or more of those disclosed in the cross-referenced patents and patent applications above. "Pattern recognition" as used herein will generally mean any system which processes a signal that is generated by an object, or is modified by interacting with an object, in order to determine which one of a set of classes that the object belongs to. Such a system might determine only that the object is or is not a member of one specified class, or it might attempt to assign the object to one of a larger set of specified classes, or find that it is not a member of any of the classes in the set. The signals processed are generally electrical signals coming from transducers which are sensitive to either acoustic or electromagnetic radiation and, if electromagnetic, they can be either visible light, infrared, ultraviolet or radar or low frequency radiation as used in capacitive sensing systems.

A trainable or a trained pattern recognition system as used herein means a pattern recognition system which is taught various patterns by subjecting the system to a variety of examples. The most successful such system is the neural network. Not all pattern recognition systems are trained systems and not all trained systems are neural networks. Other pattern recognition systems are based on fuzzy logic, sensor fusion, Kalman filters, correlation as well as linear and non-linear regression. Still other pattern recognition systems are hybrids of more than one system such as neural-fuzzy systems.

To "identify" as used herein will usually mean to determine that the object belongs to a particular set or class. The class may be one containing, for example, all rear facing child seats, one containing all human occupants, or all human occupants not sitting in a rear facing child seat depending on the purpose of the system. In the case where a particular person is to be recognized, the set or class will contain only a single element, i.e., the person to be recognized.

To "ascertain the identity of" as used herein with reference to an object will generally mean to determine the type or nature of the object (obtain information as to what the object is), i.e., that the object is an adult, an occupied rear facing child seat, an occupied front facing child seat, an unoccupied rear facing child seat, an unoccupied front facing child seat, a child, a clog, a bag of groceries, etc.

An "occupying item" or "occupant" of a seat or "object" in a seat may be a living occupant such as a human being or a dog, another living organism such as a plant, or an inanimate object such as a box or bag of groceries.

In the description herein on anticipatory sensing, the term "approaching" when used in connection with the mention of an object or vehicle approaching another will usually mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle that is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

"Out-of-position" as used for an occupant will generally means that the occupant, either the driver or a passenger, is sufficiently close to an occupant protection apparatus (airbag) prior to deployment that he or she is likely to be more seriously injured by the deployment event itself than by the accident. It may also mean that the occupant is not positioned appropriately in order to attain the beneficial, restraining effects of the deployment of the airbag. As for the occupant being too close to the airbag, this typically occurs when the occupant's head or chest is closer than some distance such as about 5 inches from the deployment door of the airbag module. The actual distance value where airbag deployment should be suppressed depends on the design of the airbag module and is typically farther for the passenger airbag than for the driver airbag.

3. Pattern Recognition Prior Art Japanese patent 3-42337 (A) to Ueno discloses a device for detecting the driving condition of a vehicle driver comprising a light emitter for irradiating the face of the driver and a means for picking up the image of the driver and storing it for later analysis. Means are provided for locating the eyes of the driver and then the irises of the eyes and then determining if the driver is looking to the side or sleeping. Ueno determines the state of the eyes of the occupant rather than determining the location of the eyes relative to the other parts of the vehicle passenger compartment. Such a system can be defeated if the driver is wearing glasses, particularly sunglasses, or another optical device which obstetrics a clear view of his/her eyes. Pattern recognition technologies such as neural networks are not used.

U.S. Pat. No. 5,008,946 to Ando uses a complicated set of rules to isolate the eyes and mouth of a driver and uses this information to permit the driver to control the radio, for example, or other systems within the vehicle by moving his eyes and/or mouth. Ando uses natural light and illuminates only the head of the driver. He also makes no use of trainable pattern recognition systems such as neural networks, nor is there any attempt to identify the contents of the vehicle nor of their location relative to the vehicle passenger compartment. Rather, Ando is limited to control of vehicle devices by responding to motion of the driver's mouth and eyes.

U.S. Pat. No. 5,298,732 to Chen also concentrates on locating the eyes of the driver so as to position a light filter between a light source such as the sun or the lights of an oncoming vehicle, and the driver's eyes. Chen does not explain in detail how the eyes are located but does supply a calibration system whereby the driver can adjust the filter so that it is at the proper position relative to his or her eyes. Chen references the use of automatic equipment for determining the location of the eyes but does not describe how this equipment works. In any event, there is no mention of illumination of the occupant, monitoring the position of the occupant, other that the eyes, determining the position of the eyes relative to the passenger compartment, or identifying any other object in the vehicle other than the driver's eyes. Also, there is no mention of the use of a trainable pattern recognition system.

U.S. Pat. No. 5,305,012 to Faris also describes a system for reducing the glare from the headlights of an oncoming vehicle. Faris locates the eyes of the occupant utilizing two spaced apart infrared cameras using passive infrared radiation from the eyes of the driver. Again, Faris is only interested in locating the driver's eyes relative to the sun or oncoming headlights and does not identify or monitor the occupant or locate the occupant relative to the passenger compartment or the airbag. Also, Faris does not use trainable patient recognition techniques such as neural networks. Faris, in fact, does not even say how the eyes of the occupant are located but refers the reader to a book entitled Robot Vision (1991) by Berthold Horn, published by MIT Press, Cambridge, Mass. A review of this book did not appear to provide the answer to this question. Also, Faris uses the passive infrared radiation rather than illuminating the occupant with active infrared radiation or in general electromagnetic radiation.

The use of neural networks as the pattern recognition technology is central to several of the implementations of this invention since it makes the monitoring system robust, reliable and practical. The resulting algorithm created by the neural network program is usually only a few dozen lines of code written in the C or C++ computer language as opposed to typically hundreds of lines when the techniques of the above patents to Ando, Chen and Faris are implemented. As a result, the resulting systems are easy to implement at a low cost, making them practical for automotive applications. The cost of the CCD and CMOS arrays, for example, have been prohibitively expensive until recently, rendering their use for VIMS impractical. Similarly, the implementation of the techniques of the above referenced patents requires expensive microprocessors while the implementation with neural networks and similar trainable pattern recognition technologies permits the use of low cost microprocessors typically costing less than $10 in large quantities.

The present invention preferably uses sophisticated trainable pattern recognition capabilities such as neural networks. Usually the data is preprocessed, as discussed below, using various feature extraction techniques. An example of such a pattern recognition system using neural networks on sonar signals is discussed in two papers by Gorman, R. P. and Sejnowski, T. J. "Analysis of Hidden Units in a Layered Network Trained to Classify Sonar Targets", *Neural Networks*, Vol. 1. pp. 75–89, 1988, and "Learned Classification of Sonar Targets Using a Massively Parallel Network", IEEE Transactions on Acoustics, Speech, and Signal Processing, Vol. 36, No. 7, Jul. 1988. Examples of feature extraction techniques can be found in U.S. Pat. No. 4,906,940 entitled "Process and Apparatus for the Automatic Detection and Extraction of Features in Images and Displays" to Green et al. Examples of other more advanced and efficient pattern recognition techniques can be found in U.S. Pat. No. 5,390,136 entitled "Artificial Neuron and Method of Using Same and U.S. patent application Ser. No. 08/076, 601 entitled "Neural Network and Method of Using Same" to Wang, S. T. Other examples include U.S. Pat. No. 5,235,339 (Morrison et al.), U.S. Pat. No. 5,214,744 (Schweizer et al), U.S. Pat. No. 5,181,254 (Schweizer et al), and U.S. Pat. No. 4,881,270 (Knecht et al). All of the above references are included herein by reference.

4. Optics Optics can be used in several configurations for monitoring the interior of a passenger compartment of an automobile. In one known method, a laser optical system uses a GaAs infrared laser beam to momentarily illuminate an object, occupant or child seat, in the manner as described and illustrated in FIG. 8 of U.S. Pat. No. 5,829,782 cross-referenced above. The receiver can be a charge-coupled device or CCD (a type of TV camera), to receive the reflected light. The laser can either be used in a scanning mode, or, through the use of a lens, a cone of light can be created which covers a large portion of the object. In these configurations, the light can be accurately controlled to only illuminate particular positions of interest within the vehicle. In the scanning mode, the receiver need only comprise a single or a few active elements while in the case of the cone of light, an array of active elements is needed. The laser system has one additional significant advantage in that the distance to the illuminated object can be determined as disclosed in the '462 patent.

In a simpler case, light generated by a non-coherent light emitting diode device is used to illuminate the desired area. In this case, the area covered is not as accurately controlled and a larger CCD or CMOS array is required. Recently, however, the cost of CCD and CMOS arrays has dropped substantially with the result that this configuration is now the most cost-effective system for monitoring the passenger compartment as long as the distance from the transmitter to the objects is not needed. If this distance is required, then the laser system, a stereographic system, a focusing system, a combined ultrasonic and optic system, or a multiple CCD or CMOS array system as described herein is required.

A mechanical focusing system, such as used on some camera systems can determine the initial position of an occupant but is too slow to monitor his/her position during a crash. A distance measuring system based of focusing is described in U.S. Pat. No. 5,193,124 (Subbarao) which can either be used with a mechanical focusing system or with two cameras, the latter of which would be fast enough. Although the Subbarao patent provides a good discussion of the camera focusing art and is therefore included herein by reference, it is a more complicated system than is needed for the practicing the instant invention. In fact, a neural network can also be trained to perform the distance determination based on the two images taken with different camera settings or from two adjacent CCD's and lens having different properties as the cameras disclosed in Subbarao making this technique practical for the purposes of this instant invention. Distance can also be determined by the system disclosed in U.S. Pat. No. 5,003,166 (Girod) by the spreading or defocusing of a pattern of structured light projected onto the object of interest. Distance can also be measured by using time of flight measurements of the electromagnetic waves or by multiple CCD or CMOS arrays as is a principle teaching of this invention.

In each of these cases, regardless of the distance measurement system used, a trained pattern recognition system, as defined above, is used in the instant invention to identify and classify, and in some cases to locate, the illuminated object and its constituent parts.

5. Optics and Acoustics

Both laser and non-laser optical systems in general are good at determining the location of objects within the two dimensional plane of the image and a pulsed laser radar system in the scanning mode can determine the distance of each part of the image from the receiver by measuring the time of flight through range gating techniques. It is also possible to determine distance with the non-laser system by focusing as discussed above, or stercographically if two spaced apart receivers are used and, in some cases the mere location in the field of view can be used to estimate the position relative to the airbag, for example. Finally, a recently developed pulsed quantum well diode laser also provides inexpensive distance measurements as discussed below.

Acoustic systems are additionally quite effective at distance measurements since the relatively low speed of sound permits simple electronic circuits to be designed and minimal microprocessor capability is required. If a coordinate system is used where the z axis is from the transducer to the occupant, acoustics are good at measuring z dimensions while simple optical systems using a single CCD are good at measuring x and y dimensions. The combination of acoustics and optics, therefore, permits all three measurements to be made from one location with low cost components as discussed in commonly assigned U.S. Pat. Nos. 5,845,000 and 5,835,613 cross-referenced above.

One example of a system using these ideas is an optical system which floods the passenger seat with infrared light coupled with a lens and CCD or CMOS array which receives and displays the reflected light and an analog to digital converter (ADC), or frame grabber, which digitizes the output of the CCD or CMOS and feeds it to an Artificial Neural Network (ANN) or other pattern recognition system for analysis. This system uses an ultrasonic transmitter and receiver for measuring the distances to the objects located in the passenger seat. The receiving transducer feeds its data into an ADC and from there the converted data is directed into the ANN. The same ANN can be used for both systems thereby providing full three-dimensional data for the ANN to analyze. This system, using low cost components, will permit accurate identification and distance measurements not possible by either system acting alone. If a phased array system is added to the acoustic part of the system, the optical part can determine the location of the driver's cars, for example, and the phased array can direct a narrow beam to the location and determine the distance to the occupant's cars.

Although the use of ultrasound for distance measurement has many advantages, it also has some drawbacks. First, the speed of sound limits the rate at which the position of the occupant can be updated to approximately 10 milliseconds, which though sufficient for most cases, is marginal if the position of the occupant is to be tracked during a vehicle crash. Second, ultrasound waves are diffracted by changes in air density that can occur when the heater or air conditioner is operated or when there is a high-speed flow of air past the transducer. Third, the resolution of ultrasound is limited by its wavelength and by the transducers, which are high Q tuned devices. Typically, the resolution of ultrasound is on the order of about 2 to 3 inches. Finally, the fields from ultrasonic transducers are difficult to control so that reflections from unwanted objects or surfaces add noise to the data.

6. Applications

The applications for this technology are numerous as described in the copending patents and patent applications listed above. They include: (i) the monitoring of the occupant for safety purposes to prevent airbag deployment induced injuries, (ii) the locating of the eyes of the occupant (driver) to permit automatic adjustment of the rear view mirror(s), (iii) the location of the seat to place the occupant's eyes at the proper position to eliminate the parallax in a heads-up display in night vision systems, (iv) the location of the ears of the occupant for optimum adjustment of the entertainment system, (v) the identification of the occupant for security reasons, (vi) the determination of obstructions in the path of a closing door or window, (vii) the determination of the position of the occupant's shoulder so that the seat belt anchorage point can be adjusted for the best protection of the occupant, (viii) the determination of the position of the rear of the occupants head so that the headrest can be adjusted to minimize whiplash injuries in rear impacts, (ix) anticipatory crash sensing, (x) blind spot detection, (xi) smart headlight dimmers, (xii) sunlight and headlight glare reduction and many others. In fact, over forty products alone have been identified based on the ability to identify and monitor objects and parts thereof in the passenger compartment of an automobile or truck.

OBJECTS AND SUMMARY OF THE INVENTION

This invention is a system to identify, locate and monitor occupants, including their parts, and other objects in the passenger compartment and objects outside of a motor vehicle, such as an automobile or truck, by illuminating the contents of the vehicle and/or objects outside of the vehicle with electromagnetic radiation, and specifically infrared radiation, or using radiation naturally emanating from the object, and using one or more lenses to focus images of the contents onto one or more arrays of charge coupled devices (CCD's) or CMOS arrays. Outputs from the CCD or CMOS arrays are analyzed by appropriate computational means employing trained pattern recognition technologies, to classify, identify or locate the contents and/or external objects. In general, the information obtained by the identification and monitoring system may be used to affect the operation of at least one other system in the vehicle.

When the vehicle interior monitoring system of this invention is installed in the passenger compartment of an automotive vehicle equipped with a passenger protective device, such as an inflatable airbag, and the vehicle is subjected to a crash of sufficient severity that the crash sensor has determined that the protective device is to be deployed, the system in accordance with the invention determines the position of the vehicle occupant relative to the airbag and disables deployment of the airbag if the occupant is positioned so that he/she is likely to be injured by the deployment of the airbag. In the alternative, the parameters of the deployment of the airbag can be tailored to the position of the occupant relative to the airbag, e.g., a depowered deployment.

In some implementations of the invention, several CCD or CMOS arrays are placed in such a manner that the distance from, and the motion of the occupant toward, the airbag can be monitored as a transverse motion across the field of the array. In this manner, the need to measure the distance from the array to the object is obviated. In other implementations, the source of infrared light is a pulse modulated laser which permits an accurate measurement of the distance to the point of reflection through the technique of range gating to measure the time of flight of the radiation pulse.

In some applications, a trained pattern recognition system, such as a neural network or neural-fuzzy system, is used to identify the occupancy of the vehicle or an object exterior to the vehicle. In some of these cases, the pattern recognition system determines which of a library of images most closely matches the seated state of a particular vehicle seat and thereby the location of certain parts of an occupant can be accurately estimated from the matched images, thus removing the requirement for the pattern recognition system to locate the head of an occupant, for example.

Principle objects and advantages of the optical sensing system in accordance with the invention are:

1. To recognize the presence of a human on a particular seat of a motor vehicle and to use this information to affect the operation of another vehicle system such as the airbag, heating and air conditioning, or entertainment systems, among others.

2. To recognize the presence of a human on a particular seat of a motor vehicle and then to determine his/her position and to use this position information to affect the operation of another vehicle system.

3. To determine the position, velocity or size of an occupant in a motor vehicle and to utilize this information to control the rate of gas generation, or the amount of gas generated by an airbag inflator system.

4. To determine the presence or position of rear seated occupants in the vehicle and to use this information to affect the operation of a rear seat protection airbag for frontal, side and/or rear impacts.

5. To recognize the presence of a rear facing child seat on a particular seat of a motor vehicle and to use this information to affect the operation of another vehicle system such as the airbag system.

6. To determine the approximate location of the eyes of a driver and to use that information to control the position of one or more of the rear view mirrors of the vehicle.

7. To monitor the position of the head of the vehicle driver and determine whether the driver is falling asleep or otherwise impaired and likely to lose control of the vehicle and to use that information to affect another vehicle system.

8. To provide an occupant position sensor which reliably permits, and in a timely manner, a determination to be made that the occupant is out-of-position, or will become out-of-position, and likely to be injured by a deploying airbag and to then output a signal to suppress the deployment of the airbag.

9. To provide an anticipatory sensor that permits accurate identification of the about-to-impact object in the presence of snow and/or fog whereby the sensor is located within the vehicle.

10. To provide a smart headlight dimmer system which senses the headlights from an oncoming vehicle or the tail lights of a vehicle in front of the subject vehicle and identifies these lights differentiating them from reflections from signs or the road surface and then sends a signal to dim the headlights.

11. To provide a blind spot detector which detects and categorizes an object in the driver's blind spot or other location in the vicinity of the vehicle, and warns the driver in the event the driver begins to change lanes, for example, or continuously informs the driver of the state of occupancy of the blind spot.

12. To provide a occupant position determination in a sufficiently short time that the position of an occupant can be tracked during a vehicle crash.

13. To provide an occupant vehicle interior monitoring system which is not affected by temperature or thermal gradients.

14. To provide an occupant vehicle interior monitoring system which has high resolution to improve system accuracy and permits the location of body parts of the occupant to be determined.

15. To provide an occupant vehicle interior monitoring system which reduces the glare from sunlight and headlights by imposing a filter between the eyes of an occupant and the light source.

16. To provide a camera system for interior and exterior monitoring, which can adjust on a pixel by pixel basis for the intensity of the received light.

These and other objects and advantages will become apparent from the following description of the preferred embodiments of the vehicle identification and monitoring system of this invention.

Basically though, one method for determining the identification and position of objects in a passenger compartment of a vehicle in accordance with the invention comprises the steps of transmitting electromagnetic waves (optical or non-optical) into the passenger compartment from one or more locations, obtaining a plurality of images of the interior of the passenger compartment from several locations, and comparing the images of the interior of the passenger compartment with stored images representing different arrangements of objects in the passenger compartment to determine which of the stored images match most closely to the images of the interior of the passenger compartment such that the identification of the objects and their position is obtained based on data associated with the stored images. The electromagnetic waves may be transmitted from transmitter/receiver assemblies positioned at different locations around a seat such that each assembly is situated in a middle of a side of the ceiling surrounding the seat or in the middle of the headliner directly above the seat. The method would thus be operative to determine the identification and/or position of the occupants of that seat. Each assembly may comprise an optical transmitter (such as an infrared LED, an infrared LED with a diverging lens, a laser with a diverging Icons and a scanning laser assembly) and an optical array (such as a CCD array and a CMOS array). The optical array is thus arranged to obtain the images of the interior of the passenger compartment represented by a matrix of pixels. To enhance the method, prior to the comparison of the images, each obtained image or output from each array may be compared with a series of stored images or arrays representing different unoccupied states of the passenger compartment, such as different positions of the seat when unoccupied, and each stored image or array is subtracted from the obtained image or acquired array. Another way to determine which stored image matches most closely to the images of the interior of the passenger compartment is to analyze the total number of pixels of the image reduced below a threshold level, and analyze the minimum number of remaining detached pixels.

Preferably, a library of stored images is generated by positioning an object on the seat, transmitting electromagnetic waves into the passenger compartment from one or more locations, obtaining images of the interior of the passenger compartment, each from a respective location, associating the images with the identification and position of the object, and repeating the positioning step, transmitting step, image obtaining step and associating step for the same object in different positions and for different objects in different positions.

If the objects include a steering wheel, a seat and a headrest, the angle of the steering wheel, the telescoping position of the steering wheel, the angle of the back of the seat, the position of the headrest and the position of the seat may be obtained by the image comparison.

One of the advantages of the invention is that after the identification and position of the objects are obtained, one or more systems in the vehicle, such as an occupant restraint device or system, a mirror adjustment system, a seat adjustment system, a steering wheel adjustment system, a pedal adjustment system, a headrest positioning system, a directional microphone, an air conditioning/heating system, an entertainment system, may be affected based on the obtained identification and position of at least one of the objects.

The image comparison may entail inputting the images or a form thereof into a neural network which provides for each image of the interior of the passenger compartment, an index of a stored image that most closely matches the image of the interior of the passenger compartment. The index is thus utilized to locate stored information from the matched image including, inter alia, a locus of a point representative of the position of the chest of the person, a locus of a point representative of the position of the head of the person, one or both ears of the person, one or both eyes of the person and the mouth of the person. Moreover, the position of the person relative to at least one airbag or other occupant restraint system of the vehicle may be determined so that deployment of the airbag(s) or occupant restraint system is controlled based on the determined position of the person. It is also possible to obtain information about the location of the eyes of the person from the image comparison and adjust the position of one or more of the rear view mirrors based on the location of the eyes of the person. Also, the location of the eyes of the person may be obtained such that an external light source may be filtered by darkening the windshield of the vehicle at selective locations based on the location of the eyes of the person. Further, the location of the cars of the person may be obtained such that a noise cancellation system in the vehicle is operated based on the location the ears of the person. The location of the mouth of the person may be used to direct a directional microphone in the vehicle.

In addition, the location of the locus of a point representative of the position of the chest or head (e.g., the probable center of the chest or head) over time may be monitored by the image comparison and one or more systems in the vehicle controlled based on changes in the location of the locus of the center of the chest or head over time. This monitoring may entail subtracting a most recently obtained image from an immediately preceding image and analyzing a leading edge of changes in the images or deriving a correlation function which correlates the images with the chest or head in an initial position with the most recently obtained images.

In one particularly advantageous embodiment, the weight applied onto the seat is measured and one or more systems in the vehicle are affected (controlled) based on the measured weight applied onto the seat and the identification and position of the objects in the passenger compartment.

In another method for determining the identification and position of objects in a passenger compartment of a vehicle in accordance with the invention, electromagnetic waves are transmitted into the passenger compartment from one or more locations, a plurality of images of the interior of the passenger compartment are obtained, each from a respective location, a three-dimensional map of the interior of the passenger compartment is created from the images, and a pattern recognition technique is applied to the map in order to determine the identification and position of the objects in the passenger compartment. The pattern recognition technique may be a neural network, fuzzy logic or an optical correlator or combinations thereof. The map may be obtained by utilizing a scamling laser radar system where the laser is operated in a pulse mode and determining the distance from the object being illuminated using range gating. (See for example, H. Kage, W. Freemen, Y Miyke, E. Funstsu, K. Tanaka, K. Kytima "Artificial retina chips as on-chip image processors and gesture-oriented interfaces", Optical Engineering, Dec. 1999, Vol. 38, No. 12, ISSN 0091-3286)

In a method for tracking motion of a vehicular occupant's head or chest in accordance with the invention, electromagnetic waves are transmitted toward the occupant from at least one location, a first image of the interior of the passenger compartment is obtained from each location, the first image being represented by a matrix of pixels, and electromagnetic waves are transmitted toward the occupant from the same location(s) at a subsequent time and an additional image of the interior of the passenger compartment is obtained from each location, the additional image being represented by a matrix of pixels. The additional image is subtracted from the first image to determine which pixels have changed in value. A leading edge of the changed pixels and a width of a field of the changed pixels is determined to thereby determine movement of the occupant from the time between which the first and additional images were taken. The first image is replaced by the additional image and the steps of obtaining an additional image and subtracting the additional image from the first image are repeated such that progressive motion of the occupant is attained.

A method for controlling deployment of an occupant restraint system in a vehicle comprises the steps of transmitting electromagnetic waves toward an occupant seated in a passenger compartment of the vehicle from one or more locations, obtaining a plurality of images of the interior of the passenger compartment, each from a respective location, analyzing the images to determine the distance between the occupant and the occupant restraint system, and controlling deployment of the occupant restraint system based on the determined distance between the occupant and the occupant restraint system. The images may be analyzed by comparing the images of the interior of the passenger compartment with stored images representing different arrangements of objects in the passenger compartment to determine which of the stored images match most closely to the images of the interior of the passenger compartment, each stored image having associated data relating to the distance between the occupant in the image and the occupant restraint system. The image comparison step may entail inputting the images or a form thereof into a neural network which provides for each image of the interior of the passenger compartment, an index of a stored image that most closely matches the image of the interior of the passenger compartment. In a particularly advantageous embodiment, the weight of the occupant on a seat is measured and deployment of the occupant restraint system is controlled based on the determined distance between the occupant and the occupant restraint system and the measured weight of the occupant.

In another method for determining the identification and position of objects in a passenger compartment of a vehicle, a plurality of images of the interior of the passenger compartment, each from a respective location and of radiation emanating from the objects in the passenger compartment, and the images of the radiation emanating from the objects in the passenger compartment are compared with stored images of radiation emanating from different arrangements of objects in the passenger compartment to determine which of the stored images match most closely to the images of the interior of the passenger compartment such that the identification of the objects and their position is obtained based on data associated with the stored images. In this embodiment, there is no illumination of the passenger compartment with electromagnetic waves. Nevertheless, the same processes described above may be applied in conjunction with this method, e.g., affecting another system based on the position and identification of the objects, a library of stored images generated, external light source filtering, noise filtering, occupant restraint system deployment control and the utilization of weight for occupant restraint system control.

BRIEF DESCRIPTION OF THE DRAWINGS

The following drawings are illustrative of embodiments of the invention and are not meant to limit the scope of the invention as encompassed by the claims.

FIG. 7A is a view of the section designated 7A in FIG. 7.

FIG. 9 is a side planar view with parts cutaway and removed of a subject vehicle and an oncoming vehicle, showing the headlights of the oncoming vehicle and the passenger compartment of the subject vehicle, containing detectors of the driver's eyes and detectors for the headlights of the oncoming vehicle and the selective filtering of the light of the approaching vehicle's headlights through the use of a liquid crystal filter in the windshield.

DETAILED DESCRIPTION OF THE PREFERRED EMBODIMENTS

Figure 1A:
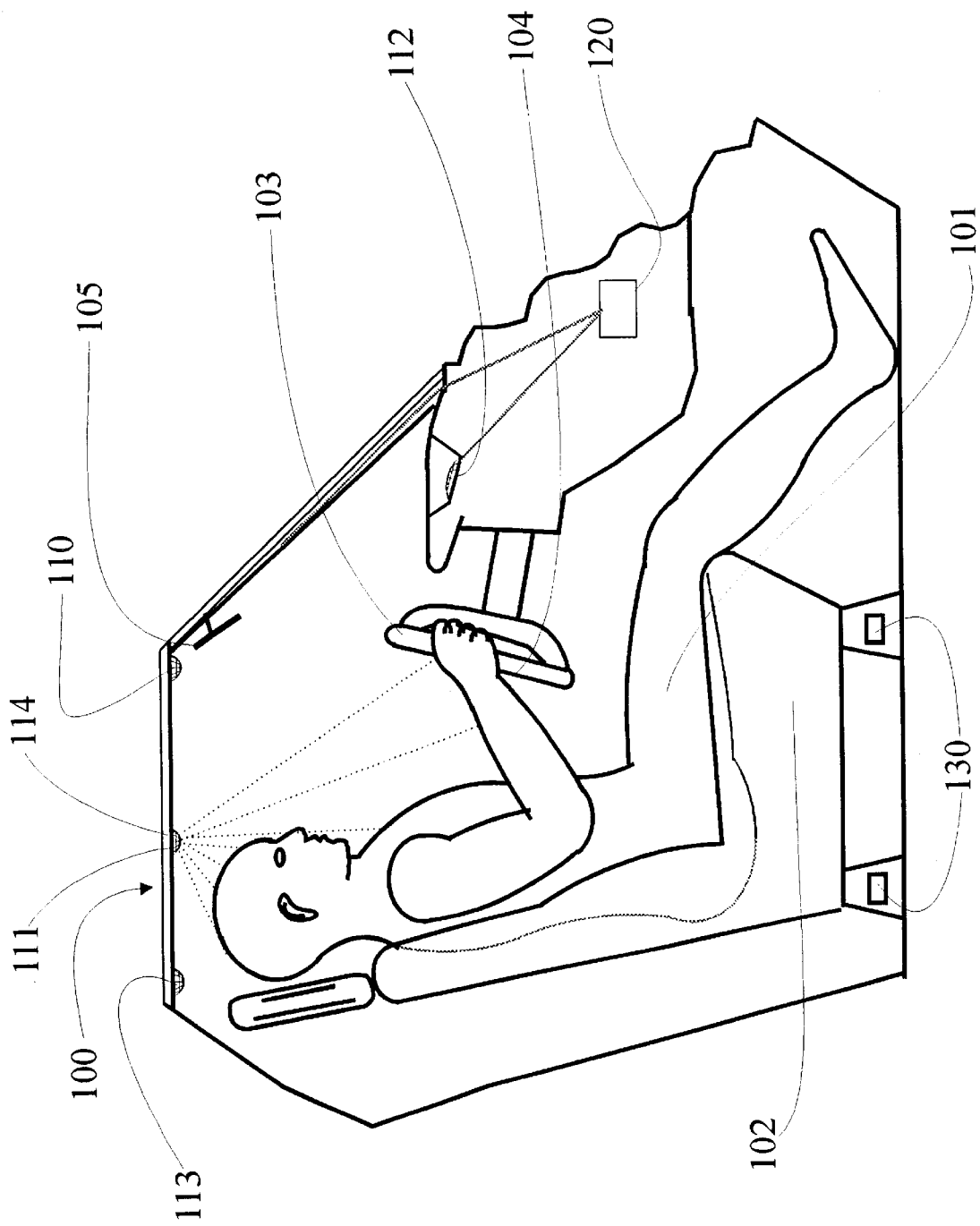
FIG. 1A is a side planar view, with certain portions removed or cut away, of a portion of the passenger compartment of a vehicle showing several preferred mounting locations of interior vehicle monitoring sensors shown particularly for sensing the vehicle driver illustrating the wave patient from a CCD or CMOS optical position sensor mounted along the side of the driver or centered above his or her head.

Referring now to the drawings wherein the same reference numerals refer to the same or similar elements, a section of the passenger compartment of an automobile is shown generally as 100 in FIGS. 1A–1D. A driver 101 of a vehicle sits on a seat 102 behind a steering wheel 103, which contains an airbag assembly 104. Five transmitter and/or receiver assemblies 110, 111, 112, 113 and 114 are positioned at various places in the passenger compartment to determine the location of various parts of the driver, e.g., the head, chest and torso, relative to the airbag and to otherwise monitor the interior of the passenger compartment. Processor means such as control circuitry 120 is connected to the transmitter/receiver assemblies 110–114 and controls the transmission from the transmitters and captures the return signals from the receivers. Control circuitry 120 usually contains analog to digital converters (ADCs) or a frame grabber, a microprocessor containing sufficient memory and appropriate software including pattern recognition algorithms, and other appropriate drivers, signal conditioners, signal generators, etc. Usually, in any given implementation, only three or four of the transmitter/receiver assemblies would be used depending on their mounting locations as described below.

It is contemplated that a system and method in accordance with the invention can include a single transmitter and multiple receivers, each at a different location. Thus, each receiver would not be associated with a transmitter forming trasmitter/receiver assemblies. Rather, for example, with reference to FIG. 1A, only element 110 would constitute a transmitter/receiver assembly and elements 111, 112, 113, 114 would be receivers only.

FIG. 1A illustrates a typical wave pattern of transmitted infrared waves from transmitter/receiver assembly 111, which is mounted on the side of the vehicle passenger compartment above the door. Transmitter/receiver assembly 114, shown overlaid onto transmitter/receiver 111, is mounted in the center headliner of the passenger compartment, near the dome light, and aimed toward the driver. Typically there will be symmetrical installation for the passenger side of the vehicle. In this embodiment, each transmitter/receiver assembly 111,114 comprises an optical transducer that will generally be used in conjunction with another optical transmitter/receiver assembly such as shown at 110, 112 and 113, which act in a similar manner. These optical transmitter/receiver assemblies are comprised of an optical transmitter, which may be an infrared LED, a laser with a diverging Icons or a scanning laser assembly, and a receiver such as a CCD or CMOS array and particularly an active pixel CMOS array or a HDRL array as discussed below. The transducer assemblies map the location of the occupant(s), objects and features thereof, in a two or three-dimensional image as will now be described in more detail.

In a preferred implementation, four transducer assemblies are positioned around the seat to be monitored, each comprising an LED with a diverging lens and a CMOS array. Although illustrated together, the illuminating source in many cases will not be co-located with the receiving array. The LED emits a controlled angle, 120° for example, diverging cone of infrared radiation that illuminates the occupant from both sides and from the front and rear. This angle is not to be confused with the field angle used in ultrasonic systems. With ultrasound, extreme care is required to control the field of the ultrasonic waves so that they will not create multipath effects and add noise to the system. With infrared, there is no reason, in the implementation now being described, other than to make the most efficient use of the infrared energy, why the entire vehicle cannot be flooded with infrared energy either from many small sources or from a few bright ones.

The image from each array is used to capture two dimensions of occupant position information, thus, the array of assembly 110, which is approximately 25% of the way laterally across the headliner in front of the driver, provides a both vertical and transverse information on the location of the driver. A similar view from the rear is obtained from the array of assembly 113. Finally, arrays of assemblies 111 and 114 provide both vertical and longitudinal driver location information. Another preferred location is the headliner centered directly above the seat of interest.

If each receiving array of assemblies 110,111,113,114 contains a matrix of 100 by 100 pixels, then 40,000 (4×100× 100) pixels or data elements of information will be created each time the system interrogates the driver seat, for example. There are many pixels of each image that can be eliminated as containing no usefull information. This typically includes the corner pixels, back of the seat and other areas where an occupant cannot reside. This pixel pruning can typically reduce the number of pixels by up to 50 percent resulting in approximately 20,000 remaining pixels. The output from each array is then compared with a series of stored arrays representing different unoccupied positions of the seat, seatback, steering wheel etc. For each array, each of the stored arrays is subtracted from the acquired array and the results analyzed to determine which subtraction resulted in the best match. The best match is determined by such things as the total number of pixels reduced below the threshold level, or the minimum number of remaining detached pixels, etc. Once this operation is completed for all four images, the position of the movable elements within the passenger compartment has been determined. This includes the steering wheel angle, telescoping position, seatback angle, headrest position, and seat position. This information can be used elsewhere by other vehicle systems to eliminate sensors that are currently being used to sense such positions of these complements. Alternately, the sensors that are currently on the vehicle for sensing these complement positions can be used to simplify processes described above.

An alternate technique of differentiating between the occupant and the vehicle is to use motion. If the images of the passenger seat are compared over time, reflections from fixed objects will remain static whereas reflections from vehicle occupants will move. This movement can be used to differentiate the occupant from the background.

Following the subtraction process described above, each image now consists of typically as many as 50 percent fewer pixels leaving a total of approximately 10,000 pixels remaining. The resolution of the images in each array can now be reduced by combining adjacent pixels and averaging the pixel values. This results in a reduction to a total pixel count of approximately 1000. The matrices of information that contains the pixel values are now normalized to place the information in a location in the matrix which is independent of the seat position. The resulting normalized matrix of 1000 pixel values is now used as input into an artificial neural network and represents the occupancy of the seat independent of the position of the occupant.

The neural network has been previously trained on a significant number of occupants of the passenger compartment. The number of such occupants depends strongly on whether the driver or the passenger seat is being analyzed. The variety of seating states or occupancies of the passenger seat is vastly greater than that of the driver seat. For the driver seat, a typical training set will consist of approximately 100 different vehicle occupancies. For the passenger seat, this number can exceed 1000. These numbers are used for illustration purposes only and will differ significantly from vehicle model to vehicle model.

The neural network is now used to determine which of the stored occupancies most closely corresponds to the measured data. The output of the neural network is an index of the setup that was used during training that most closely matches the current measured state. This index is used to locate stored infonration from the matched trained occupancy. Information that has been stored for the trained occupancy typically includes the locus of the centers of the chest and head of the driver, as well as the approximate radius of pixels which is associated with this center to define the head area, for example. For the case of FIG. 1A, it is now known from this exercise where the head, chest, and perhaps the eyes and ears, of the driver are most likely to be located and also which pixels should be tracked in order to know the precise position of the driver's head and chest. What has been described above is the identification process.

The normalization process conducted above created a displacement value for each of the CCD or CMOS arrays in the four assemblies 110,111,113,114 which can now be used in reverse to find the precise location of the driver's head and chest or chest, for example, relative to the known location of the airbag. From the vehicle geometry, and the head and chest location information, a choice can now be made as to whether to track the head or chest for dynamic out-of-position.

Tracking of the motion of the occupant's head or chest can be done using a variety of techniques. One preferred technique is to use differential motion, that is, by subtracting the current image from the previous image to determine which pixels have changed in value and by looking at the leading edge of the changed pixels and the width of the changed pixel field, a measurement of the movement of the pixels of interest, and thus the driver, can be readily accomplished. Alternately, a correlation function can be derived which correlates the pixels in the known initial position of the head, for example, with pixels that were derived from the latest image. The displacement of the center of the correlation pixels would represent the motion of the head of the occupant. Naturally, a wide variety of other techniques will be now obvious to those skilled in the art.

There are many mathematical tecliques that can be applied to simplify the above process. One technique used in military pattern recognition, for example, uses the Fourier transform of particular areas in an image to match with known Fourier transforms of known images. In this manner, the identification and location can be determined simultaneously. There is even a technique used for target identification whereby the Fourier transforms are compared optically. Other techniques utilize thresholding to limit the pixels that will be analyzed by any of these processes. Other techniques search for particular features and extract those features and concentrate merely on the location of certain of these features. (See for example the Kage et al. artificial retina publication referenced above which, together with the references cited therein, is included herein by reference.)

The principal used in this preferred implementation of the invention is to use images of different views of the occupant to correlate with known images that were used to train a neural network for vehicle occupancy. Then carefully measured positions of the known images are used to locate particular parts of the occupant such as his or her head, chest, eyes, cars, mouth, etc. An alternate approach is to make a three-dimensional map of the occupant and to precisely locate these features using neural networks, fuzzy logic or other rules. One method of obtaining a three-dimensional map is to utilize a scanning laser radar system where the laser is operated in a pulse mode and the distance from the object being illuminated is determined using range gating in a manner similar to that described in various patents on micropower impulse radar to McEwan. (See for example U.S. Pat. Nos. 5,457,394 and 5,521,600).

The scanning portion of the pulse laser radar device can be accomplished using rotating mirrors, mechanical motors, or preferably, a solid state system, for example one utilizing $TeO_2$ as an optical diffraction crystal with lithium niobate crystals driven by ultrasound (although other solid state systems not necessarily using $TeO_2$ and lithium niobate crystals could also be used). An alternate method is to use a micromachined mirror, which is supported at its center and caused to deflect by miniature coils. Such a device has been used to provide two-dimensional scamling to a laser. This has the advantage over the $TeO_2$—lithium niobate technology in that it is inherently smaller and lower cost and provides two-dimensional scanning capability in one small device. The maximum angular deflection that can be achieved with this process is on the order of about 10 degrees. Thus, a diverging lens will be needed for the scanning system.

An alternate method of obtaining three-dimensional information from a scanning laser system is to use multiple arrays to replace the single arrays used in FIG. 1A. In the case, the arrays are displaced from each other and, through triangulation, the location of the reflection from the illumination by a laser beam of a point on the object can be determined in a manner that is understood by those skilled in the art.

One important point concerns the location and number of optical assemblies. It is possible to use fewer than four such assemblies with a resulting loss in accuracy. The number of four was chosen so that either a forward or rear assembly or either of the side assemblies can be blocked by a newspaper, for example, without seriously degrading the performance of the system. Since drivers rarely are reading newspapers while driving, fewer than four arrays are usually adequate for the driver side.

The particular locations of the optical assemblies were chosen to give the most accurate information as to the locations of the occupant. This is based on an understanding of what information can be best obtained from a visual image. There is a natural tendency on the part of humans to try to gauge distance from the optical sensors directly. This, as can be seen above, is at best complicated involving focusing systems, stereographic systems, multiple arrays and triangulation, time of flight measurement, etc. What is not intuitive to humans is to not try to obtain this distance directly from apparatus or techniques associated with the mounting location. Whereas ultrasound is quite good for measuring distances from the transducer (the z-axis), optical systems are better at measuring distances in the vertical and lateral directions (the x and y-axes). Since the precise locations of the optical transducers are known, that is, the geometry of the transducer locations is known relative to the vehicle, there is no need to try to determine the displacement of an object of interest from the transducer (the z-axis) directly. This can more easily done indirectly by another transducer. That is, the z-axis to one transducer is the x-axis to another.

Ultrasonic transducers are relatively good at measuring the distance along a radius to a reflective object. An optical array, such as disclosed herein, on the other hand, can get accurate measurements in two dimensions, the lateral and vertical dimensions relative to the transducer. If we assume that the optical array has dimensions of 100 by 100 as compared to an ultrasonic sensor that has a single dimension of 100, an optical array can give therefore 100 times as much information as the ultrasonic array. Most importantly, this vastly greater amount of information does not cost significantly more to obtain than the information from the ultrasonic sensor.

As illustrated in FIGS. 1A–D, the optical sensors are typically located at the positions where the desired information is available with the greatest resolution. These positions are typically in the center front and center rear of the occupancy seat and at the center on each side and top. This is in contrast to the optimum location for ultrasonic sensors, which are the corners of such a rectangle that outlines the seated volume.

Systems based on ultrasonics and neural networks have been very successful in analyzing the seated state of both the passenger and driver seats of automobiles. Such systems are now going into production for preventing airbag deployment when a rear facing child seat or and out-of-position occupant is present. The ultrasonic systems, however, suffer from certain natural limitations that prevent the system accuracy from getting better than about 99 percent. These limitations relate to the fact that the wavelength of ultrasound is typically between 3 and 8 mm. As a result, unexpected results occur which are due partially to the interference of reflections from different surfaces. Additionally, commercially available ultrasonic transducers are tuned devices that require several cycles before they transmit significant energy and similarly require several cycles before they effectively receive the reflected signals. This requirement has the effect of smearing the resolution of the ultrasound to the point that, for example, using a conventional 40 kHz transducer, the resolution of the system is approximately three inches.

In contrast, the wavelength of infrared is less than one micron and no significant interferences occur. Similarly, the system is not tuned and therefore is theoretically sensitive to a very few cycles. As a result, resolution of the optical system is determined by the pixel spacing in the CCD or CMOS arrays. For this application, typical arrays have been chosen to be 100 pixels by 100 pixels and therefore the space being imaged can be broken up into pieces that are significantly less than 1 cm in size. Naturally, if greater resolution is required arrays having larger numbers of pixels are readily available. Another advantage of optical systems is that special lenses can be used to magnify those areas where the information is most critical and operate at reduced resolution where this is not the case. For example, the area closest to the at-risk zone in front of the airbag can be magnified. This is not possible with ultrasonic systems.

To summarize, although ultrasonic neural network systems are operating with high accuracy, they do not totally eliminate the problem of deaths and injuries caused by airbag deployments. Optical systems, on the other hand, at little increase in cost, have the capability of virtually 100 percent accuracy. Additional problems of ultrasonic systems arise from the slow speed of sound and diffraction caused by variations is air density. The slow sound speed limits the rate at which data can be collected and thus eliminates the possibility of tracking the motion of an occupant during a high speed crash.

In the case of FIG. 1A, transmitter/receiver assemblies 110–114 emit infrared waves that reflect off of the head and chest of the driver and return thereto. Periodically, the device, as commanded by control circuitry 120, transmits a pulse of infrared waves and the reflected signal is detected by the same or a different device. The transmitters can either transmit simultaneously or sequentially. An associated electronic circuit and algorithm in control circuitry 120 processes the returned signals as discussed above and determines the location of the occupant in the passenger compartment. This information is then sent to the crash sensor and diagnostic circuitry, which may also be resident in control circuitry 120 (programmed within a control module), which determines if the occupant is close enough to the airbag that a deployment might, by itself, cause injury which exceeds that which might be caused by the accident itself. In such a case, the circuit disables the airbag system and thereby prevents its deployment. In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises to 95% for a more distant occupant. In the alternative, the crash sensor and diagnostic circuitry optionally resident in control circuitry 120 may tailor the parameters of the deployment (time to initiation of deployment, rate of inflation, rate of deflation, deployment time, etc.) based on the current position and possibly velocity of the occupant, e.g., a depowered deployment.

Although a driver system has been illustrated, the front and rear seat passenger systems would be similar.

In another implementation, the sensor algorithm may determine the rate that gas is generated to affect the rate that the airbag is inflated. In all of these cases, the position of the occupant is used to affect the deployment of the airbag as to whether or not it should be deployed at all, the time of deployment and/or the rate of inflation.

The algorithm in control circuitry 120 can also be designed to determine the location of the occupant's eyes either directly or indirectly through a determination of the location of the occupant and an estimation of the position of the eyes therefrom. As such, the position of the rear view mirror 105 can be adjusted to optimize the driver's use thereof.

Weight sensors 130 are also included in the system shown in FIG. 1A. Although strain gage type sensors are schematically illustrated mounted to the supporting structure of the seat 102, any other type of weight sensor can be used. Strain gage weight sensors are described in detail in co-pending U.S. patent application Ser. No. 09/193,209 that is included herein by reference as if it were entirely incorporated herein.

The accuracy of the optical occupant sensor is critically dependent upon the accuracy of the camera. The dynamic range of light within a vehicle exceeds 120 decibels. When a car is driving at night, for example, very little light is available whereas when driving in a bright sunlight, especially in a convertible, the light intensity can overwhelm most cameras. Additionally, the camera must be able to adjust rapidly to changes and light caused by, for example, the emergence of the vehicle from tunnel, or passing by other obstructions such as trees, buildings, other vehicles, etc. which temporarily block the sun and cause a strobing effect at frequencies approaching 1 Hz.

Recently, improvements have been made to CMOS cameras that have significantly increased their dynamic range. New logarithmic high dynamic range technology such as developed by IMS Chips of Stuttgart, Germany, is now available in HDRC (High Dynamic Range CMOS) cameras. This technology provides a 120 dB dynamic intensity response at each pixel in a mono chromatic mode. The technology has a 1 million to one dynamic range at each pixel. This prevents blooming, saturation and flaring normally associated with CMOS and CCD camera technology. This solves a problem that will be encountered in an automobile when going from a dark tunnel into bright sunlight. Such a range would even exceed the 120 dB intensity.

There is also significant infrared radiation from bright sunlight and from incandescent lights within the vehicle. Such situations may even exceed the dynamic range of the HDRC camera and additional filtering may be required. Changing the bias on the receiver array, the use of a mechanical iris, or of electrochromic glass or liquid crystal can provide this filtering on a global basis but not at a pixel level. Filtering can also be used with CCD arrays, but the amount of filtering required is substantially greater than for the HDRC camera.

Liquid crystals operate rapidly and give as much as a dynamic range of 10,000 to 1 but may create a pixel interference affect. Electrochromic glass operates more slowly but more uniformly thereby eliminating the pixel affect. The pixel effect arises whenever there is one pixel device in front of another. This results in various aliasing, Moire patterns and other ambiguities. One way of avoiding this is to blur the image. Another solution is to use a large number of pixels and combine groups of pixels to form one pixel of information and thereby to blur the edges to eliminate some of the problems with aliasing and Moire patterns.

One straightforward approach is the use a mechanical iris. Standard cameras already have response times of several tens of milliseconds range. They will switch, for example, in a few frames on a typical video camera (1 frame=0.033 seconds). This is sufficiently fast for categorization but much too slow for dynamic out-of-position tracking.

An important feature of the IMS Chips HDRC camera is that the full dynamic range is available at each pixel. Thus, if there are significant variations in the intensity of light within the vehicle, and thereby from pixel to pixel, such as would happen when sunlight streams and through a window, the camera can automatically adjust and provide the optimum exposure on a pixel by pixel basis. The use of the camera having this characteristic is very beneficial to the invention described herein and contributes significantly to system accuracy. CCDs have a rather limited dynamic range due to their inherent linear response and consequently cannot come close to matching the performance of human eyes. A key advantage of the IMS Chips HDRC camera is its logarithmic response which comes closest to matching that of the human eye.

Another approach, which is applicable in some vehicles, is to record an image without the infrared illumination and then a second image with the infrared illumination and to then subtract the first image from the second image. In this manner, illumination caused by natural sources such as sunlight or even from light bulbs within the vehicle can be subtracted out. Naturally, using the logarithmic pixel system of the IMS Clips camera care must be taken to include the logarithmic effect during the subtraction process. For some cases, natural illumination such as from the sun, light bulbs within the vehicle, or radiation emitted by the object itself can be used alone without the addition of a special source of infrared illumination.

Other imaging systems such as CCD arrays can also of course be use with this invention. However, the techniques will be quite different since the camera is very likely to saturate when bright light is present and to require the full resolution capability when the light is dim. Generally when practicing this invention the interior of the passenger compartment will be illuminated with infrared radiation.

There are other bright sources of infrared that must be accounted for. These include the sun and any light bulbs that may be present inside the vehicle. This lack of a high dynamic range inherent with the CCD technology requires the use of an iris, liquid crystal, or electrochromic glass filter to be placed between the camera and the scene. Even with these filters however, some saturation will take place with CCD cameras under bright sun or incandescent lamp exposure. This saturation reduces the accuracy of the image and therefore the accuracy of the system. In particular the training regimen that must be practiced with CCD cameras is more severe since all of the saturation cases must be considered since the camera is unable to appropriately adjust. Thus, although CCD cameras can be use, HDRC logarithmic cameras such as manufactured by IMS Chips are preferred. They not only provide a significantly more accurate image but also significantly reduce the amount of training effort and associated data collection that must be undertaken during the development of the neural network algorithm or other computational intelligence system. In some applications, it is possible to use other more deterministic image processing or pattern recognition systems than neural networks.

Another very important feature of the HDRC camera from IMS Chips is that the shutter time is constant at less than 100 ns irrespective of brightness of the scene. The pixel data arrives at constant rate synchronous with the internal imager clock. Random access to each pixel facilitates high-speed intelligent access to any sub-frame (block) size or sub-sampling ratio and a trade-off of frame speed and frame size therefore results. For example, a scene with 128 K pixels per frame can be taken at 120 frames per second, or about 8 milliseconds per frame, whereas a sub-frame can be taken in run at as high as 4000 frames per second with 4 K pixels per frame. This combination allows the maximum resolution for the identification and classification part of the occupant sensor problem while permitting a concentration on those particular pixels which track the head or chest, as described above, for dynamic out-of-position tracking. In fact the random access features of these cameras can be used to track multiple parts of the image simultaneously while ignoring the majority of the image, and do so at very high speed. For example, the head can be tracked simultaneously with the chest by defining two separate sub-frames that need not be connected. This random access pixel capability, therefore, is optimally suited or recognizing and tracking vehicle occupants. It is also suited for monitoring the environment outside of the vehicle for purposes of blind spot detection, collision avoidance and anticipatory sensing. Photobit Corporation of 135 North Los Robles Ave., Suite 700, Pasadena, Calif. 91101 manufactures another camera with some characteristics similar to the IMS Chips camera. Other competitive cameras can be expected to appear on the market.

Photobit refers to their Active Pixel Technology as APS. According to Photobit, in the APS, both the photodetector and readout amplifier are part of each pixel. This allows the integrated charge to be converted into a voltage in the pixel that can then be read out over X-Y wires instead of using a charge domain shift register as in CCDs. This column and row addressability (similar to common DRAM) allows for window of interest readout (windowing) which can be utilized for on chip electronic pan/tilt and zoom. Windowing provides added flexibility in applications, such as disclosed herein, needing image compression, motion detection or target tracking. The APS utilizes intra-pixel amplification in conjunction with both temporal and fixed pattern noise suppression circuitry (i.e. correlated double sampling), which produces exceptional imagery in terms of wide dynamic range (~75 dB) and low noise (~15 e-rms noise floor) with low fixed pattern noise (<0.15% sat). Unlike CCDs, the APS is not prone to column streaking due to blooming pixels. This is because CCDs rely on charge domain shift registers that can leak charge to adjacent pixels when the CCD register overflows. Thus, bright lights "bloom" and cause unwanted streaks in the image. The active pixel can drive column busses at much greater rates than passive pixel sensors and CCDs. On-chip analog-to-digital conversion (ADC) facilitates driving high speed signals off chip. In addition, digital output is less sensitive to pickup and crosstalk, facilitating computer and digital controller interfacing while increasing system robustness. A high speed APS recently developed for a custom binary output application produced over 8,000 frames per second, at a resolution of 128×128 pixels. It is possible to extend this design to a 1024×1024 array size and achieve greater than 1000 frames per second for machine vision. All of these features are important to many applications of this invention.

These advanced cameras, as represented by the HDRC and the APS cameras, now make it possible to more accurately monitor the environment in the vicinity of the vehicle. Heretofore, the large dynamic range of environmental light has either blinded the cameras when exposed to bright light or else made them unable to record images when the light level was low. Even the HDRC camera with its 120 dB dynamic range may be marginally sufficient to handle the fluctuations in environmental light that occur. Thus, the addition of a electrochromic, liquid crystal, or other similar filter may be necessary. This is particularly true for cameras such as the Photobit APS camera with its 75 dynamic range.

At about 120 frames per second, these cameras are adequate for cases where the relative velocity between vehicles is low. There are many cases, however, where this is not the case and a much higher monitoring rate is required. This occurs for example, in collision avoidance and anticipatory sensor applications. The HDRC camera is optimally suited for handling these cases since the number of pixels that are being monitored can be controlled resulting in a frame rate as high as about 4000 frames per second with a smaller number of pixels.

Another key advantage of the HDRC camera is that it is quite sensitive to infrared radiation in the 0.8 to 1 manometer wavelength range. This range is generally beyond visual range for humans permitting this camera to be used with illumination sources that are not visible to the human eye. Naturally, a notch filter is frequently used with the camera to eliminate unwanted wavelengths. These cameras are available from the Institute for Microelectronics (IMS Chips), Allamndring 30a, D-70569 Stuttgart, Gemiany with a variety of resolutions ranging from 512 by 256 to 720 by 576 pixels and can be custom fabricated for the resolution and response time required.

Figure 1B:
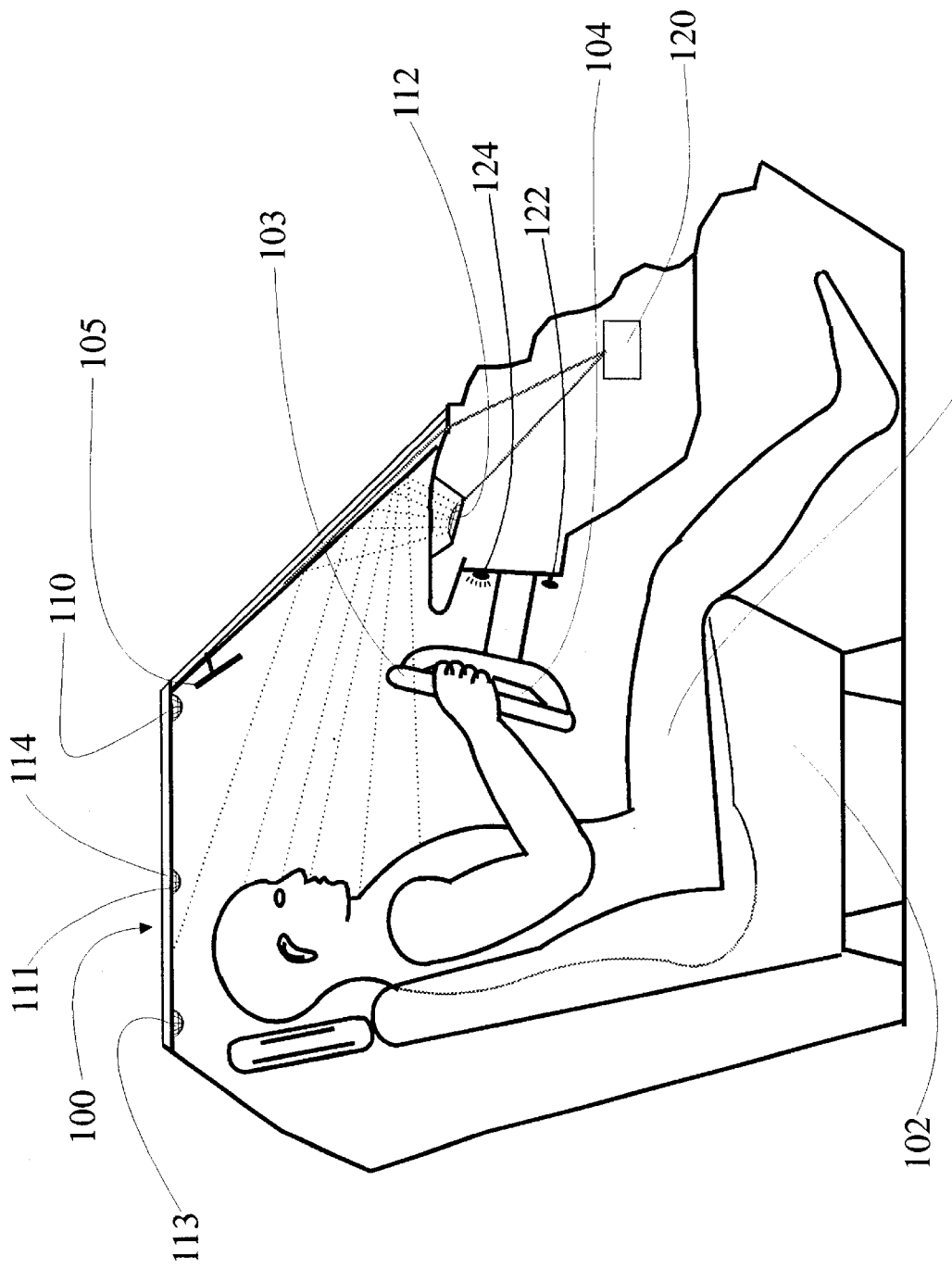
FIG. 1B is a view as in FIG. 1A illustrating the wave pattern from an optical system using an infrared light source and a CCD or CMOS array receiver using the windshield as a reflection surface and showing schematically the interface between the vehicle interior monitoring system of this invention and an instrument panel mounted inattentiveness warning light or buzzer and reset button.

An optical infrared transmitter and receiver assembly is shown generally at 112 in FIG. 1B and is mounted onto the instrument panel facing the windshield. Assembly 112, shown enlarged, comprises a source of infrared radiation, or another form of electromagnetic radiation, and a CCD or CMOS array of typically 160 pixels by 160 pixels. In this embodiment, the windshield is used to reflect the illumination light provided by the infrared radiation toward the objects in the passenger compartment and also reflect the light being reflected back by the objects in the passenger compartment, in a manner similar to the "heads-up" display which is now being offered on several automobile models. The "heads-up" display, of course, is currently used only to display information to the driver and is not used to reflect light from the driver to a receiver. Once again, unless one of the distance measuring systems as described below is used, this system alone cannot be used to determine distances from the objects to the sensor. Its main purpose is object identification and monitoring. Depending on the application, separate systems can be used for the driver and for the passenger. In some cases, the cameras located in the instrument panel which receive light reflected off of the windshield can be co-located with multiple lenses whereby the respective lenses aimed at the driver and passenger seats respectively.

Assembly 112 is actually about two centimeters in diameter and is shown greatly enlarged in FIG. 1B. Also, the reflection area on the windshield is considerably smaller than illustrated and special provisions are made to assure that this area of the windshield is flat and reflective as is done generally when heads-up displays are used. For cases where there is some curvature in the windshield, it can be at least partially compensated for by the CCD optics.

When using the surface of the windshield as a reflector of infrared radiation, care must be taken to assure that the desired reflectivity at the frequency of interest is achieved. Mirror materials, such as metals and other special materials manufactured by Eastman Kodak, have a reflectivity for infrared frequencies that is substantially higher than at visible frequencies. They are thus candidates for coatings to be placed on the windshield services for this purpose. If two spaced apart CCD arrays are used, then the distance to the various objects within the passenger compartment can be found by using a triangulation algorithm which locates similar features on both images and determines their relative location on the images. An alternate method is to use a lens with a short focal length. In this case, the Iens is mechanically focused to determine the clearest image and thereby obtain the distance to the object. This is similar to certain camera auto-focusing systems such as one manufactured by Fuji of Japan. Naturally, other methods can be used as described in the patents and patent applications referenced above.

Once a vehicle interior monitoring system employing a sophisticated pattern recognition system, such as a neural network, is in place, it is possible to monitor the motions of the driver over time, and his/her response to various stimuli, and determine if he or she is falling asleep, has become incapacitated or otherwise unable to operate the vehicle. In such an event, the vehicle can be caused to respond in a number of different ways. One such system is illustrated in FIG. 1B and consists of a monitoring system having the transducer assembly 112 coupled to a microprocessor in control circuitry 120 which is programmed to compare the motions of the driver over time and trained to recognize changes in behavior representative of becoming incapacitated, e.g., the eyes blinking erratically and remaining closed for ever longer periods of time. If the system determines that there is a reasonable probability that the driver has fallen asleep, for example, then it can activate an alann, e.g., turn on a warning light shown here as 124 or send a warning sound. If the driver fails to respond to the warning by pushing a button 122, for example, then the horn and lights of the vehicle can be operated in a manner to warn other vehicles and the vehicle may be brought to a stop. Naturally, other responses can also be programmed and other tests of driver attentiveness can be used without resorting to attempting to monitor the motions of the driver's eyes.

The use of the windshield as a reflector is particularly useful when monitoring the eyes of the driver. The reflections from the cornea are highly directional as every driver knows whose lights have reflected off the eyes of an animal on the roadway. For this to be effective, the eyes of the driver must be looking at the radiation source. Since the driver is presumably looking through the windshield, the source of the radiation must also come from the windshield and the reflections from the drivers eyes must also be in the direction of the windshield. Using this technique, the time that the driver spends looking through the windshield can be monitored and if that time drops below some threshold value it can be presumed that the driver is not attentive and may be sleeping or otherwise incapacitated.

An even more sophisticated system of monitoring the behavior of the driver is to track the driver's eye motions using such techniques as are described in: Freidman et al., U.S. Pat. No. 4,648,052 entitled "Eye Tracker Communication System"; Heyner et al., U.S. Pat. No. 4,720,189 entitled "Eye Position Sensor"; Hutchinson, U.S. Pat. No. 4,836,670 entitled "Eye Movement Detector"; and Hutchinson, U.S. Pat. No. 4,950,069 entitled "Eye Movement Detector With Improved Calibration and Speed", all of which are included herein by reference as well as U.S. Pat. Nos. 5,008,946 and 5,305,012 referenced above. The detection of the impaired driver in particular can be best determined by these techniques. These systems make use of pattern recognition techniques plus, in many cases, the transmitter and CCD receivers must be appropriately located so that the reflection off of the cornea of the driver's eyes can be detected as discussed in the above referenced patents. The size of the CCD arrays used herein permits their location, sometimes in conjunction with a reflective windshield, where this corneal reflection can be detected with some difficulty. Sunglasses or other items can interfere with this process.

The location of the eyes of the driver, for this application, is greatly facilitated by the teachings of this invention as described above. Although others have suggested the use of eye motions and corneal reflections for drowsiness determination, up until now there has not been a practical method for locating the driver's eyes with sufficient precision and reliability as to render this technique practical. Also, although sunglasses might defeat such a system, most drowsiness caused accidents happen at night where it is less likely that sunglasses are worn.

The eye tracker systems discussed above are facilitated by the instant invention since one of the main purposes of determining the location of the driver's eyes either by directly locating them with trained pattern recognition technology or by inferring their location from the location of the driver's head, is so that the seat can be automatically positioned to place the driver's eyes into the "eye-ellipse". The eye-ellipse is the proper location for the driver's eyes to permit optimal operation of the vehicle and for the location of the mirrors etc. Thus, if the location of the driver's eyes are known, then the driver can be positioned so that his or her eyes are precisely situated in the eye ellipse and the reflection off of the eye can be monitored with a small eye tracker system. Also, by ascertaining the location of the driver's eves, a rear view mirror positioning device can be controlled to adjust the mirror 105 to an optimal position.

In addition to finding the location of the eyes, the location of the ears is becoming more important. Many automobile accidents are now being caused by driver's holding on and talking into cellular phones. Vehicle noise significantly deteriorates the quality of the sound heard by the driver from speakers. This problem can be solved through the use of hypersound and by knowing the location of the cars of the driver. Hypersound permits the precise focusing of sound waves along a line from the speaker with little divergence of the sound field. Thus, if the locations of the ears of the driver are known, the sound can be projected to them directly thereby overcoming much of the vehicle noise. In addition to the use of hypersound, directional microphones are well known in the microphone art which are very sensitive to sound coming from a particular direction. If the driver has been positioned so that his eyes are in the eye ellipse, then the location of the driver's mouth is also accurately known and a fixed position directional microphone can be used to selectively sense sound emanating from the mouth of the driver. In many cases, the sensitivity of the microphone can be designed to include a large enough area such that most motions of the driver's head can be tolerated. Alternately the direction of the microphone can be adjusted using motors or the like. Systems of noise cancellation now also become possible if the ear locations are precisely known and noise canceling microphones as described in copending U.S. provisional patent application Ser. No. 60/170,973, which is included herein by reference, if the location of the driver's mouth is known.

Figure 1C:
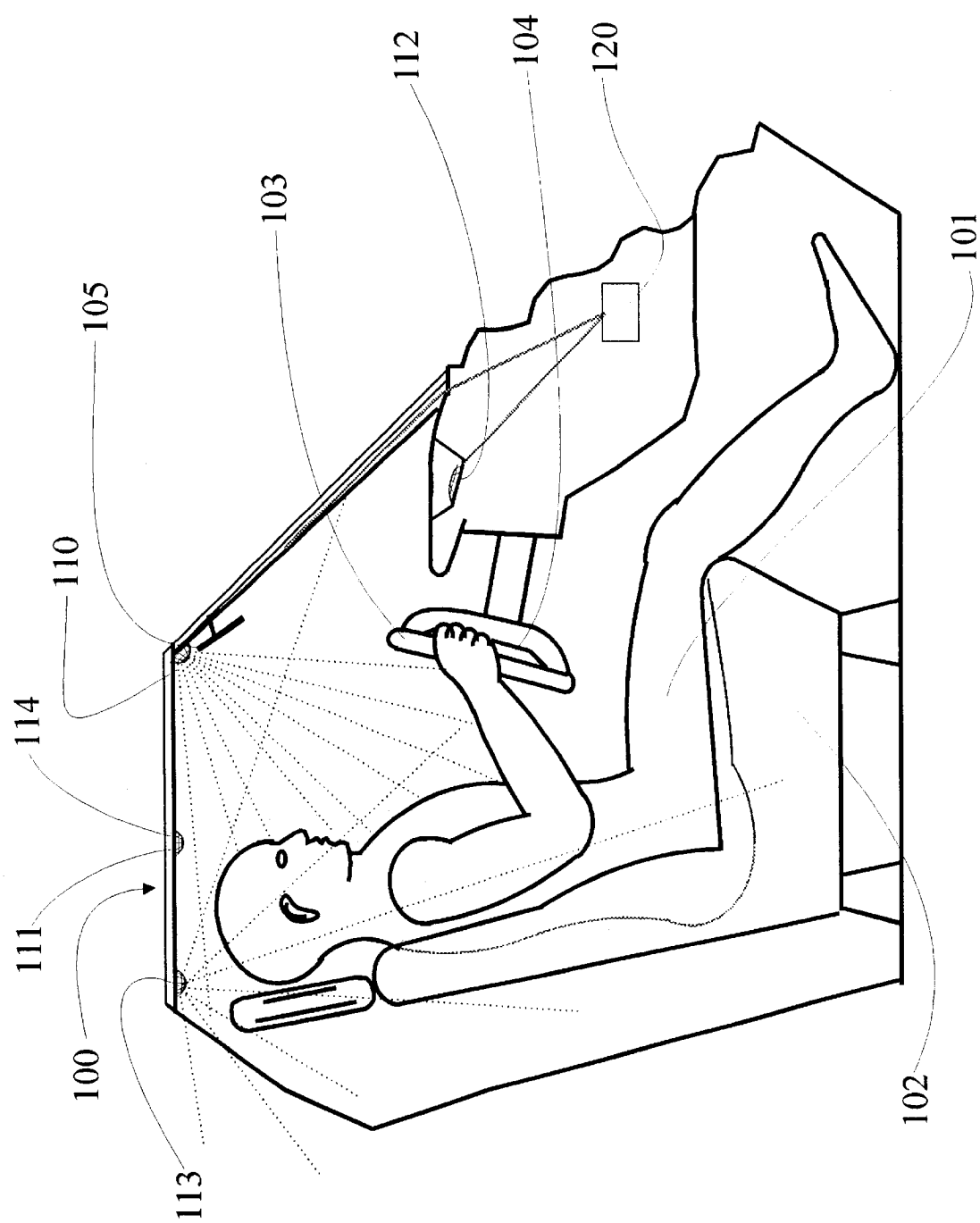
FIG. 1C is a view as in FIG. 1A illustrating the wave pattern from an optical system using an infrared light source and a CCD or CMOS array receiver where the CCD or CMOS array receiver is covered by a lens permitting a wide angle view of the contents of the passenger compartment.

Infrared waves are shown coming from the front and back transducer assemblies 110 and 113 in FIG. 1C.

Figure 1D:
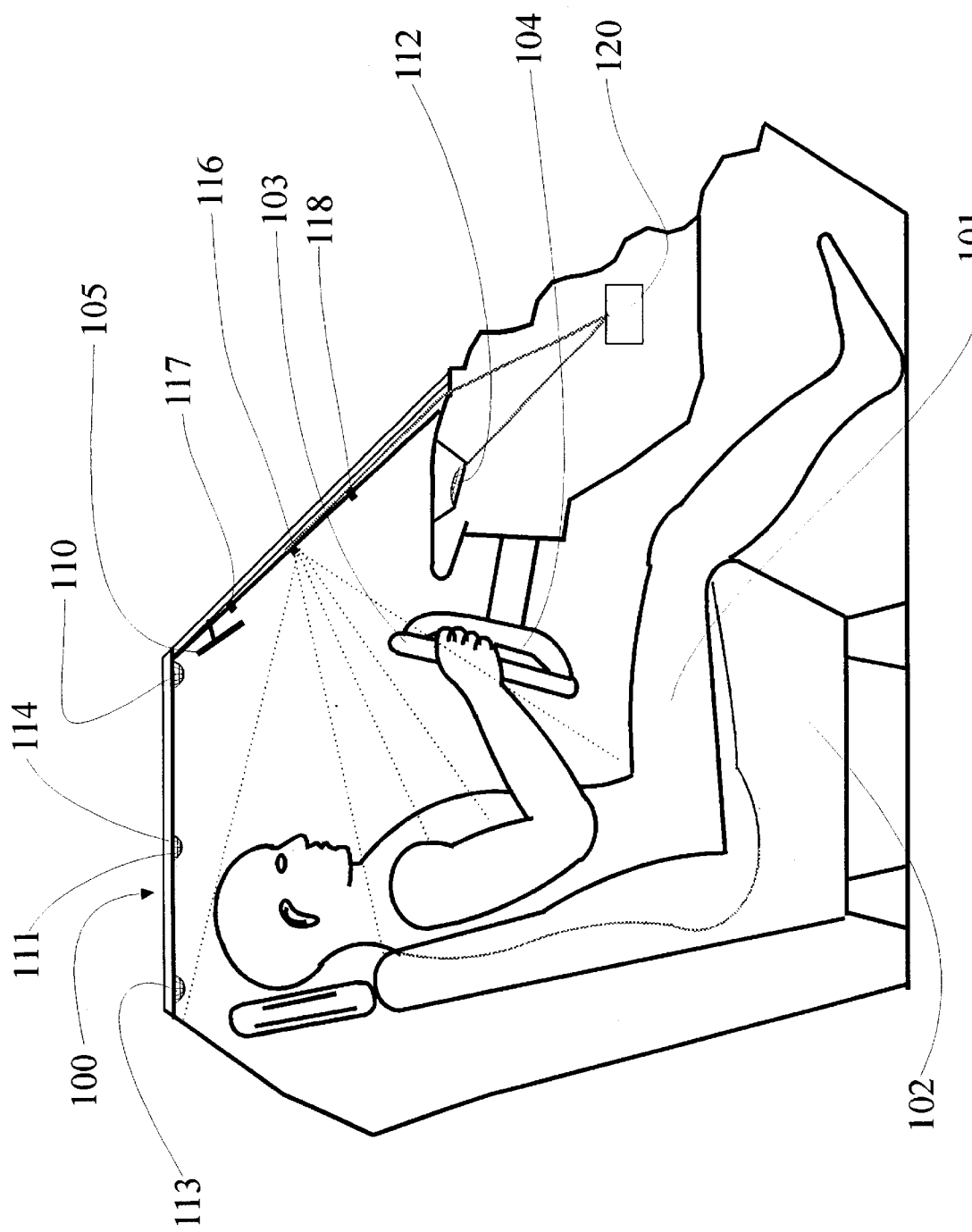
FIG. 1D is a view as in FIG. 1A illustrating the wave pattern from a pair of small CCD or CMOS array receivers and one infrared transmitter where the spacing of the CCD or CMOS arrays permits an accurate measurement of the distance to features on the occupant.

FIG. 1D illustrates two optical systems each having a source of infrared radiation and a CCD or CMOS array receiver. The price of such arrays has dropped dramatically recently making them practical for interior and exterior vehicle monitoring. In this embodiment, transducers 110 and 113 are CMOS arrays having 160 pixels by 160 pixels covered by a lens. In some applications, this can create a "fisheye" effect whereby light from a wide variety of directions can be captured. One such transducer placed by the dome light or other central position in the vehicle headliner, such as the transducer designated 113, can monitor the entire vehicle interior with sufficient resolution to determine the occupancy of the vehicle, for example. CCD's such as those used herein are available from Marshall Electronics Inc. of Culver City, CA. A fisheye lens is ". . . a wide-angle photographic lens that covers an angle of about 180°, producing a circular image with exaggerated foreshortening in the center and increasing distortion toward the periphery". (*The American Heritage Dictionary of the English Language, Third Edition*, 1992 *by Houghton Mifflin Coinpany*). This distortion of a fisheye lens can be substantially changed by modifying the shape of the lens to permit particular portions of the interior passenger compartment to be observed. Also, in many cases the full 180° is not desirable and a lens which captures a smaller angle may be used. Although primarily spherical lenses are illustrated herein, it is understood that the particular lens design will depend on the location in the vehicle and the purpose of the particular receiver.

CCD arrays are in common use in television cameras, for example, to convert an image into an electrical signal. For the purposes herein, a CCD will be defined to include all devices, including CMOS arrays, APS arrays, artificial retinas and particularly HDRC arrays, which are capable of converting light frequencies, including infrared, visible and ultraviolet, into electrical signals. The particular CCD array used for many of the applications disclosed herein is implemented on a single chip that is less than two centimeters on a side. Data from the CCD array is digitized and sent serially to an electronic circuit (at times designated 120 herein) containing a microprocessor for analysis of the digitized data. In order to minimize the amount of data that needs to be stored, initial processing of the image data takes place as it is being received from the CCD array, as discussed in more detail above. In some cases, some image processing can take place on the chip such as described in the Kage et al. artificial retina article referenced above.

One method of determining distance to an object directly without resorting to range finders, which require multiple arrays, is to use a mechanical focusing system. However, the use of such an apparatus is cumbersome, expensive, slow and has questionable reliability. An alternative is to use the focusing systems described in the above referenced U.S. Pat. Nos. 5,193,124 and 5,003,166, however, such systems require expensive hardware and/or elaborate algorithms. Another alternative is illustrated in FIG. 1D where transducer 116 is an infrared source having a wide transmission angle such that the entire contents of the front driver's seat is illuminated. Receiving CCD transducers 117 and 118 are shown spaced apart so that a stereographic analysis can be made by the control circuitry 120. This circuitry 120 contains a microprocessor with appropriate pattern recognition algorithms along with other circuitry as described above. In this case, the desired feature to be located is first selected from one of the two returned images from either CCD transducer 117 or 118. The software then determines the location of the same feature, through correlation analysis or other methods, on the other image and thereby, through analysis familiar to those skilled in the art, determines the distance of the feature from the transducers.

Transducers 116–118 are illustrated mounted onto the A-pillar of the vehicle, however, since these transducers are quite small, typically approximately 2 cm on a side, they could alternately be mounted onto the windshield itself, or other convenient location which provides a clear view of the portion of the passenger compartment being monitored. Other preferred mounting locations include the headliner above and also the side of the seat.

A new class of laser range finders has particular application here. This product, as manufactured by Power Spectra, Inc. of Sunnyvale, Calif., is a GaAs pulsed laser device which can measure up to 30 meters with an accuracy of <2 cm and a resolution of <1 cm. This system is implemented in combination with transducer 116 and one of the receiving transducers 117 or 118 may thereby be eliminated. Once a particular feature of an occupying item of the passenger compartment has been located, this device is used in conjunction with an appropriate aiming mechanism to direct the laser beam to that particular feature. The distance to that feature is then known to within 2 cm and with calibration even more accurately. In addition to measurements within the passenger compartment, this device has particular applicability in anticipatory sensing and blind spot monitoring applications exterior to the vehicle. An alternate technology using range gating to measure the time of flight of electromagnetic pulses with even better resolution can be developed based on the teaching of the McEwan patents listed above and included herein by reference.

Figure 2A:
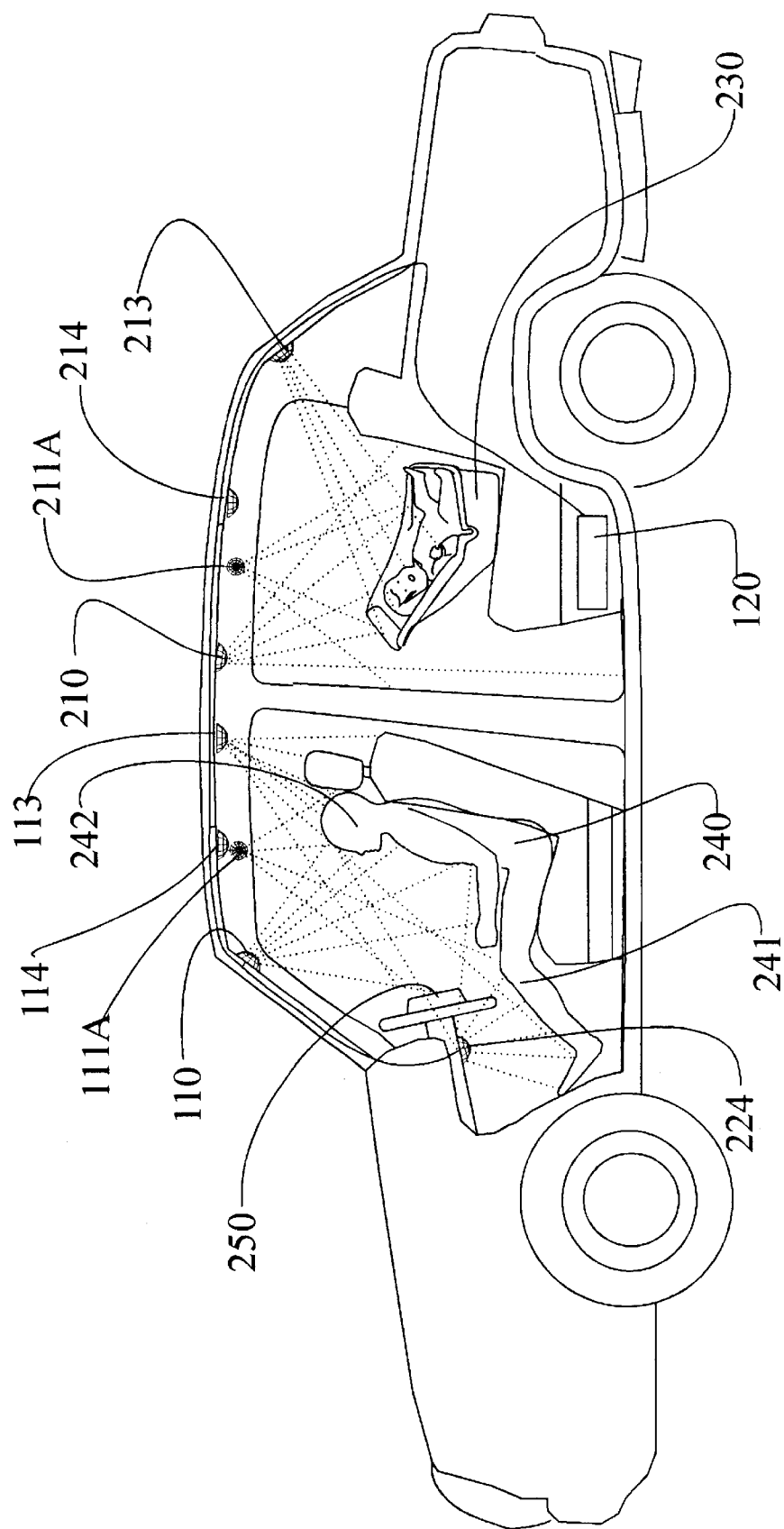
FIG. 2A is a side view, with certain portions removed or cut away, of a portion of the passenger compartment of a vehicle showing preferred mounting locations of optical interior vehicle monitoring sensors

FIG. 2A is a side view, with certain portions removed or cut away, of a portion of the passenger compartment of a vehicle showing preferred mounting locations of optical interior vehicle monitoring sensors (transmitter/receiver assemblies or transducers) 110, 111A, 113, 114, 210, 211A, 213, 214, and 224. Each of these sensors is illustrated as having a lens and is shown enlarged in size for clarity. In a typical actual device, the diameter of the lens is approximately 2 cm and it protrudes from the mounting surface by approximately 1 cm. This small size renders these devices almost unnoticeable by vehicle occupants. Since these sensors are optical, it is important that the lens surface remains relatively clean. Control circuitry 120, which is coupled to each transducer, contains a self-diagnostic feature where the image returned by a transducer is compared with a stored image and the existence of certain key features is verified. If a receiver fails this test, a warning is displayed to the driver which indicates that cleaning of the lens surface is required. The technology illustrated in FIG. 2A can be used for numerous purposes including: (i) the determination of the presence of a rear facing child seat 230, (ii) the monitoring of the rear of an occupant's head 242, (iii) the monitoring of the position of occupant 240, (iv) the monitoring of the position of the occupant's knees 241, (v) the monitoring of the occupant's position relative to the airbag 250, (vi) the measurement of the occupant's height, as well as other monitoring functions as described elsewhere herein.

Figure 2B:
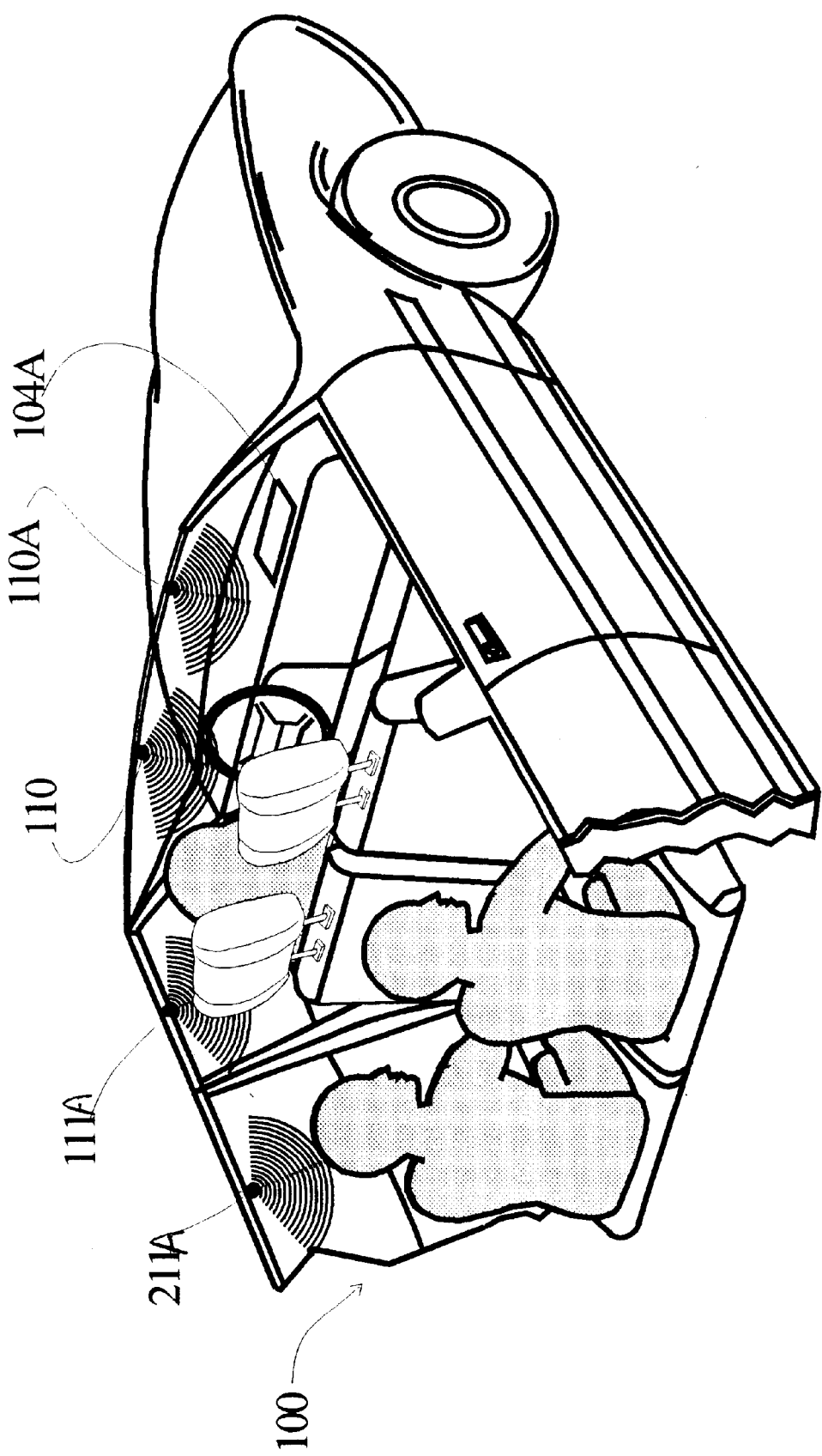
FIG. 2B is a perspective view, with certain portions removed or cut away, of a portion of the passenger compartment of a vehicle showing some preferred mounting locations of optical interior vehicle monitoring sensors.

FIG. 2B is a perspective view corresponding to the embodiment shown in FIG. 2A illustrating some of the transducer mounting locations (including sensor 110A). The passenger side airbag is designated 104A.

Figure 3:
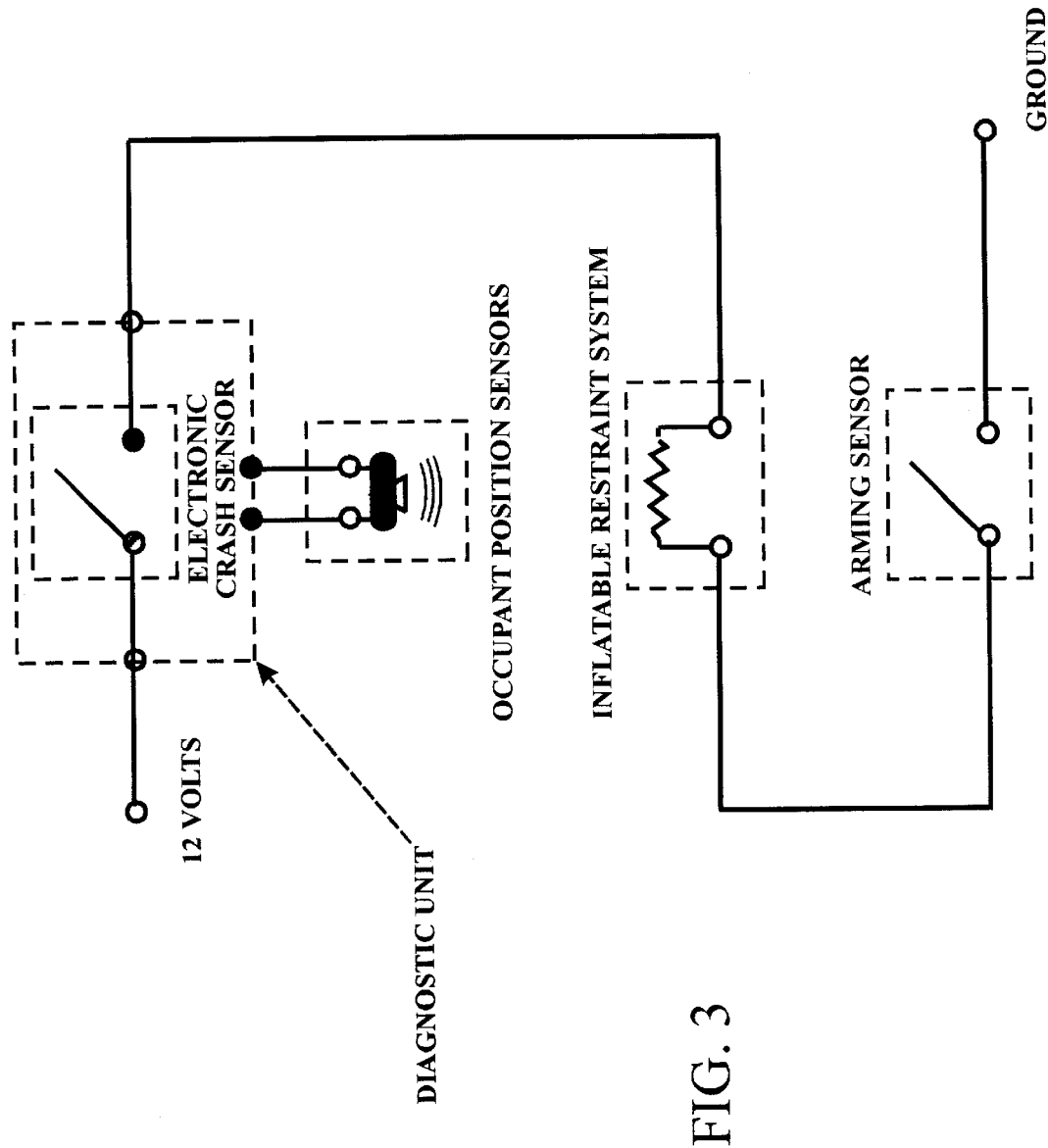
FIG. 3 is a circuit schematic illustrating the use of the vehicle interior monitoring sensor used as an occupant position sensor in conjunction with the remainder of the inflatable restraint system.

The occupant position sensor in any of its various forms is integrated into the airbag system circuitry as shown schematically in FIG. 3. In this example, the occupant position sensors are used as an input to a smart electronic sensor and diagnostic system. The electronic sensor determines whether one or more of the airbags should be deployed based on the vehicle acceleration crash pulse, or crush zone mounted crash sensors, or a combination thereof, and the occupant position sensor determines whether the occupant is too close to any of the airbags and therefore that the deployment should not take place. In FIG. 3, the electronic crash sensor located within the sensor and diagnostic unit determines whether the crash is of such severity as to require deployment of one or more of the airbags. The occupant position sensors determine the location of the vehicle occupants relative to the airbags and provide this information to the sensor and diagnostic unit that then determines whether it is safe to deploy each airbag and/or whether the deployment parameters should be adjusted. The arming sensor, if one is present, also determines whether there is a vehicle crash occurring. In such a case, if the sensor and diagnostic unit and the arming sensor both determine that the vehicle is undergoing a crash requiring one or more airbags and the position sensors determine that the occupants are safely away from the airbag(s), the airbag (s), or inflatable restraint system, is deployed.

Figure 4:
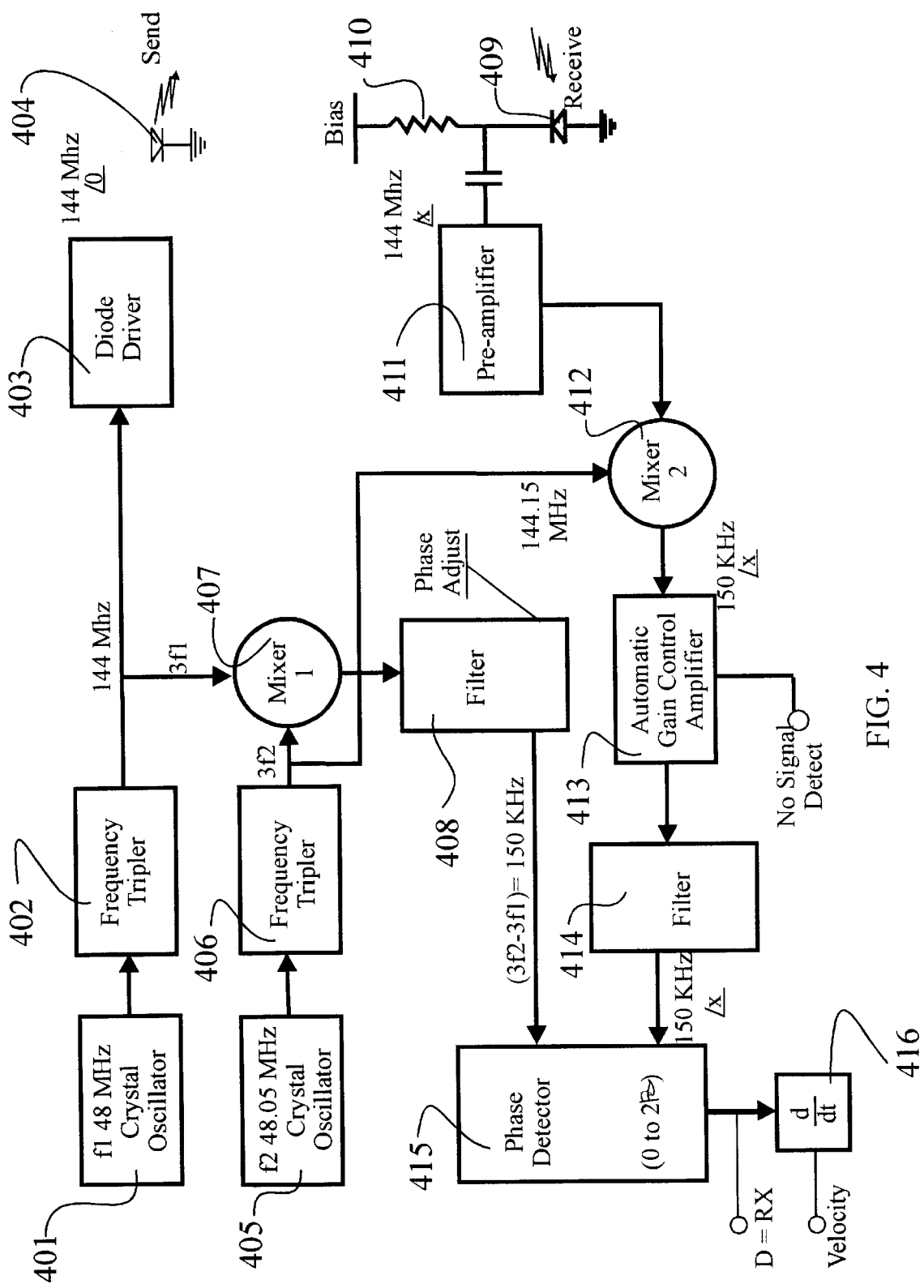
FIG. 4 is a schematic illustrating the circuit of an occupant position-sensing device using a modulated infrared signal, beat frequency and phase detector system.

A particular implementation of an occupant position sensor having a range of from 0 to 2 meters (corresponding to an occupant position of from 0 to 1 meter since the signal must travel both to and from the occupant) using infrared is illustrated in the block diagram schematic of FIG. 4. The operation is as follows. A 48 MHz signal, f1, is generated by a crystal oscillator 401 and fed into a frequency tripler 402 which produces an output signal at 144 MHz. The 144 MHz signal is then fed into an infrared diode driver 403 which drives the infrared diode 404 causing it to emit infrared light modulated at 144 MHz and a reference phase angle of zero degrees. The infrared diode 404 is directed at the vehicle occupant. A second signal f2 having a frequency of 48.05 MHz, which is slightly greater than f1, is similarly fed from a crystal oscillator 405 into a frequency tripler 406 to create a frequency of 144.15 MHz. This signal is then fed into a mixer 407 which combines it with the 144 MHz signal from frequency tripler 402. The combined signal from the mixer 407 is then fad to filter 408 which removes all signals except for the difference, or beat frequency, between 3 times f1 and 3 times f2, of 150 kHz. The infrared signal which is reflected from the occupant is received by receiver 409 and fed into pre-amplifier 411, a resistor 410 to bias being coupled to the connection between the receiver 409 and the pre-amplifier 411. This signal has the same modulation frequency, 144 MHz, as the transmitted signal but now is out of phase with the transmitted signal by an angle x due to the path that the signal took from the transmitter to the occupant and back to the receiver. The output from pre-amplifier 411 is fed to a second mixer 412 along with the 144.15 MHz signal from the frequency tripler 406. The output from mixer 412 is then amplified by an automatic gain amplifier 413 and fed into filter 414. The filter 414 eliminates all frequencies except for the 150 kHz difference, or beat, frequency, in a similar manner as was done by filter 408. The resulting 150 kIHz frequency, however, now has a phase angle x relative to the signal from filter 408. Both 150 kHz signals are now fed into a phase detector 415 which determines the magnitude of the phase angle x. It can be shown mathematically that, with the above values, the distance from the transmitting diode to the occupant is x/345.6 where x is measured in degrees and the distance in meters. The velocity can also be obtained using the distance measurement as represented by 416. An alternate method of obtaining distance information, as discussed above, is to use the teachings of the McEwan patents discussed above.

The applications described herein have been illustrated using the driver of the vehicle. The same systems of determining the position of the occupant relative to the airbag apply to front and rear seated passengers, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for both the passenger and driver, the airbag system can be individually optimized for each occupant and result in further significant injury reduction. In particular, either the driver or passenger system can be disabled if either the driver or passenger is out-of-position or if the passenger seat is unoccupied.

There is almost always a driver present in vehicles that are involved in accidents where an airbag is needed. Only about 30% of these vehicles, however, have a passenger. If the passenger is not present, there is usually no need to deploy the passenger side airbag. The occupant monitoring system, when used for the passenger side with proper pattern recognition circuitry, can also ascertain whether or not the seat is occupied, and if not, can disable the deployment of the passenger side airbag and thereby save the cost of its replacement. The same strategy applies also for monitoring the rear seat of the vehicle. Also, a trainable pattern recognition system, as used herein, can distinguish between an occupant and a bag of groceries, for example. Finally, there has been much written about the out-of-position child who is standing or otherwise positioned adjacent to the airbag, perhaps due to pre-crash braking. The occupant position sensor described herein can prevent the deployment of the airbag in this situation as well as in the situation of a rear facing child seat as described above.

The use of trainable pattern recognition technologies such as neural networks is an important part of the instant invention, although other non-trained pattern recognition systems such as fuzzy logic, correlation, Kalman filters, and sensor fusion (a derivative of fuzzy logic) can also be used. These technologies are implemented using computer programs to analyze the patterns of examples to determine the differences between different categories of objects. These computer programs are derived using a set of representative data collected during the training phase, called the training set. After training, the computer programs output a computer algorithm containing the rules permitting classification of the objects of interest based on the data obtained after installation in the vehicle. These rules, in the form of an algorithm, are implemented in the system that is mounted onto the vehicle. The determination of these rules is central to the pattern recognition techniques used in this invention. Artificial neural networks using back propagation are thus far the most successful of the rule determination approaches, however, research is underway to develop systems with many of the advantages of back propagation neural networks, such as learning by training, without the disadvantages, such as the inability to understand the network and the possibility of not converging to the best solution. In particular, back propagation neural networks will frequently give an unreasonable response when presented with data than is not within the training data. It is well known that neural networks are good at interpolation but poor at extrapolation. A combined neural network fuzzy logic system, on the other hand, can substantially solve this problem. Additionally, there are many other neural network systems in addition to back propagation. In fact, one type of neural network may be optimum for identifying the contents of the passenger compartment and another for determining the location of the object dynamically.

In some implementations of this invention, such as the determination that there is an object in the path of a closing window as described below, the rules are sufficiently obvious that a trained researcher can look at the returned optical signals and devise an algorithm to make the required determinations. In others, such as the determination of the presence of a rear facing child seat or an occupant, artificial neural networks are frequently used to determine the rules. One such set of neural network software for determining the pattern recognition rules, is available from the NeuralWare Corporation of Pittsburgh, Pennsylvania. Numerous books and articles, including more that 500 U.S. patents, describe neural networks in great detail and thus the theory and application of this technology is well known and will not be repeated here. Except in a few isolated situations where neural networks have been used to solve particular problems limited to engine control, for example, they have not heretofore been applied to automobiles and trucks.

The system generally used in the instant invention, therefore, for the determination of the presence of a rear facing child seat, an occupant, or an empty seat is the artificial neural network or a neural-fuzzy system. In this case, the network operates on the returned signals from the CCD array as sensed by transducers 110, 111, 113 and 114 (not shown) in FIG. 5, for example. For the case of the front passenger seat, for example, through a training session, the system is taught to differentiate between the three cases. This is done by conducting a large number of experiments where available child seats are placed in numerous positions and orientations on the front passenger seat of the vehicle. Similarly, a sufficiently large number of experiments are run with human occupants and with boxes, bags of groceries and other objects. As many as 1,000,000 such experiments are run before the neural network is sufficiently trained so that it can differentiate among the three cases and output the correct decision with a very high probability.

Once the network is determined, it is possible to examine the result to determine, from the algorithm created by the NeuralWare software, the rules that were finally arrived at by the trial and error training technique. In that case, the rules can then be programmed into a microprocessor. Alternately, a neural computer can be used to implement the net directly. In either case, the implementation can be carried out by those skilled in the art of pattern recognition using neural networks.

Figure 5:
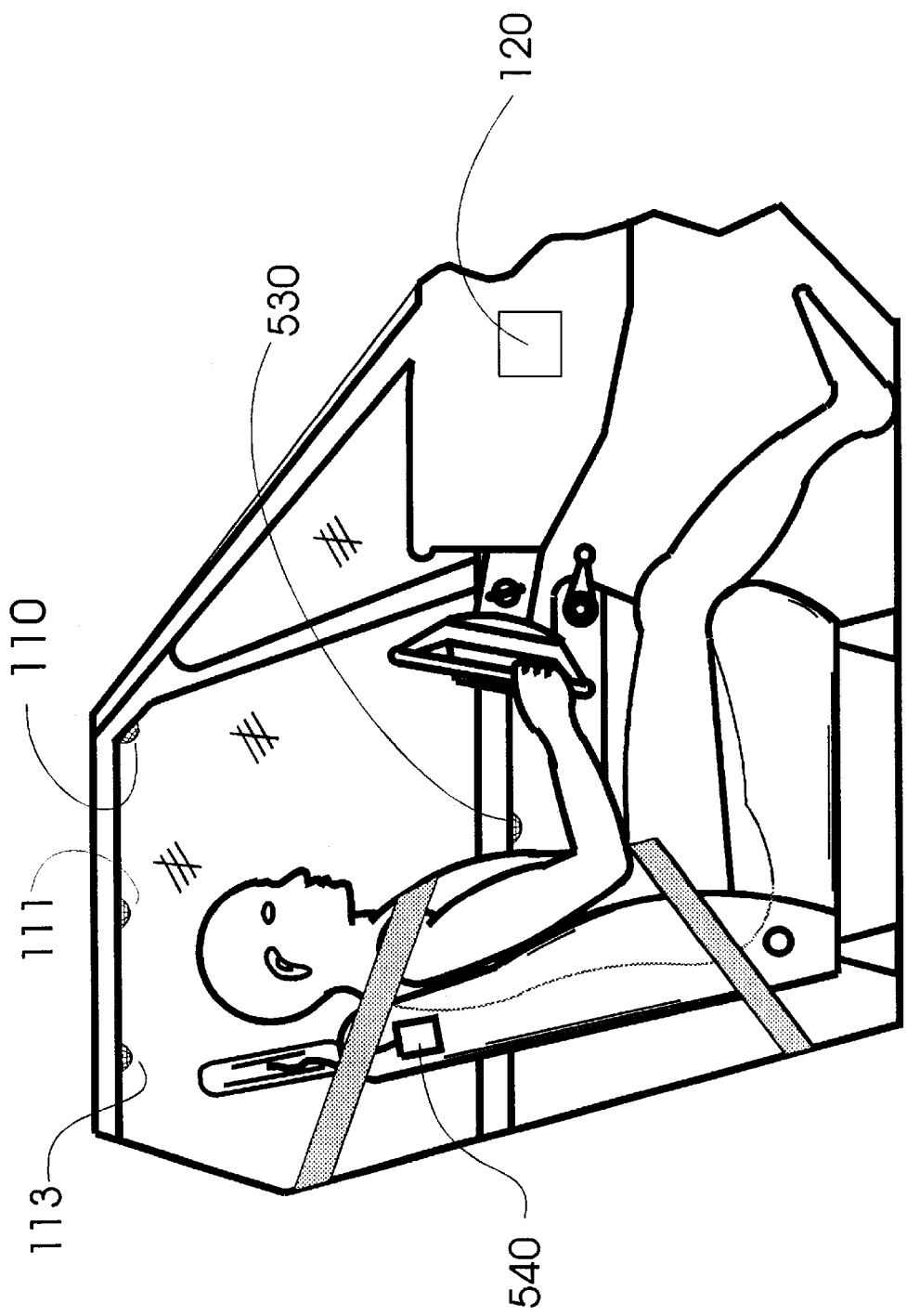
FIG. 5 is a side planer view with parts cutaway and removed of a vehicle showing the passenger compartment containing a driver and a preferred mounting location for an optical occupant position sensor for use in side impacts and also of an optical rear of occupant's head locator for use with a headrest adjustment system to reduce whiplash injuries in rear impact crashes.

There are several methods measuring the height of the driver for use in automatically adjusting the seat or for adjusting the seatbelt anchorage point. Some alternatives are shown in FIG. 5, which is a side plan view of the front portion of the passenger compartment showing three height measuring transducers or sensors 110,111,113, all of which are mounted on or near the headliner. These transducers may already be present because of other implementations of the vehicle interior identification and monitoring system described herein. The combination of four transducers can determine, by the methods described above, the location of the head with great accuracy.

Optical transducers using CCD arrays are now becoming price competitive and, as mentioned above, will soon be the technology of choice for interior vehicle monitoring. A single CCD array of 160 by 160 pixels, for example, coupled with the appropriate trained pattern recognition software, can be used to form an image of the head of an occupant and accurately locate the head for some of the purposes of this invention.

The position of the rear of the head can also be known once the locus of the head has been determined. This information can be used to determine the distance front the headrest to the rearmost position of the occupant's head and to control the position of the headrest so that it is properly positioned behind the occupant's head to offer optimum support in the event of a rear impact. Although the headrest of most vehicles is adjustable, it is rare for an occupant to position it properly, if at all. Each year, there are in excess of 400,000 whiplash injuries in vehicle impacts approximately 90,000 of which are from rear impacts (source: National Highway Traffic Safety Administration, (NHTSA)). A properly positioned headrest could substantially reduce the frequency of such injuries that can be accomplished by the head detector of this invention. The head detector is connected to the headrest control mechanism and circuitry 540. This mechanism is capable of moving the headrest up and down and, in some cases, rotating it fore and aft. Thus, the control circuitry 120 may be coupled to headrest control mechanism and circuitry 540 to adjust the headrest based on the determined location of the rear of the occupant's head.

An occupant position sensor for side impacts used with a door mounted airbag system is illustrated at 530 in FIG. 5. This sensor has the particular task of monitoring the space adjacent to the door-mounted airbag. Sensor 530 may also be coupled to control circuitry 120 which can process and use the information provided by sensor 530 in the determination of the location or identity of the occupant or location of a part of the occupant.

Seatbelts are most effective when the upper attachment point to the vehicle is positioned vertically close to the shoulder of the occupant being restrained. If the attachment point is too low, the occupant experiences discomfort from the rubbing of the belt on his or her shoulder. If it is too high, the occupant may experience discomfort due to the rubbing of the belt against his or her neck and the occupant will move forward by a greater amount during a crash which may result in his or her head striking the steering wheel. For these reasons, it is desirable to have the upper seatbelt attachment point located slightly above the occupant's shoulder. To accomplish this for various sized occupants, the location of the occupant's shoulder must be known, which can be accomplished by the vehicle interior monitoring system described herein.

Figure 6:
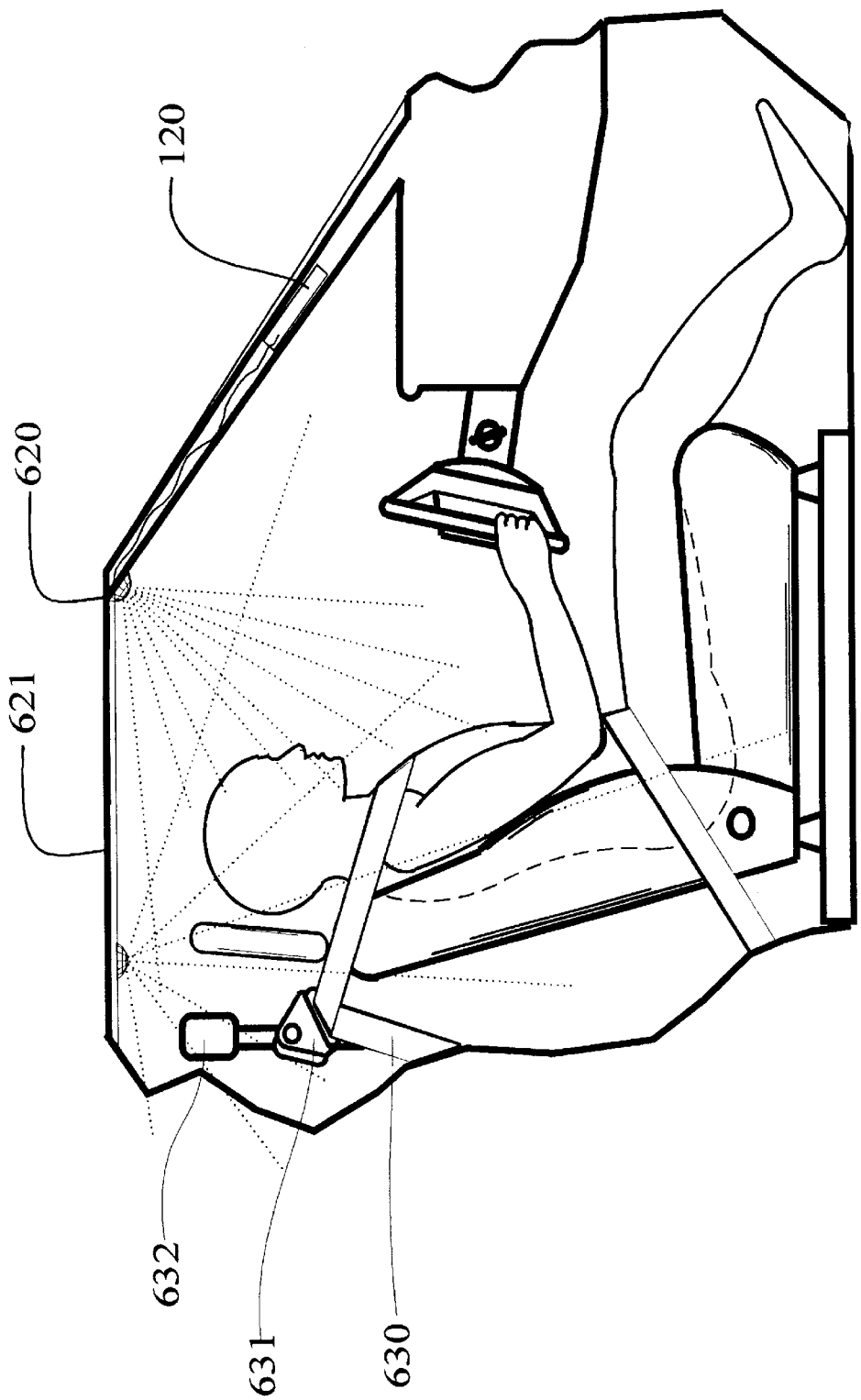
FIG. 6 is a side plan view of the interior of an automobile, with portions cut away and removed, with two optical occupant height measuring sensors, one mounted into the headliner above the occupant's head and the other mounted onto the A-pillar and also showing a seatbelt associated with the seat where the seatbelt has an adjustable upper anchorage point which is automatically adjusted corresponding to the height of the occupant.

Such a system is illustrated in FIG. 6, which is a side planer view of a seatbelt anchorage adjustment system. In this system, infrared transmitter and CCD array receivers 620 and 621 are positioned in a convenient location proximate the occupant's shoulder, such as in connection with the headliner, above and usually to the outside of the occupant's shoulder. An appropriate pattern recognition system, as may be resident in control circuitry 120 to which the receivers 620,621 are coupled, as described above is then used to determine the location and position of the shoulder. This information is provided by control circuitry 120 to the seatbelt anchorage height adjustment system 632 (through a conventional coupling arrangement), shown schematically, which moves the attachment point 631 of the seatbelt 630 to the optimum vertical location for the proper placement of the seatbelt 630.

Figure 7:
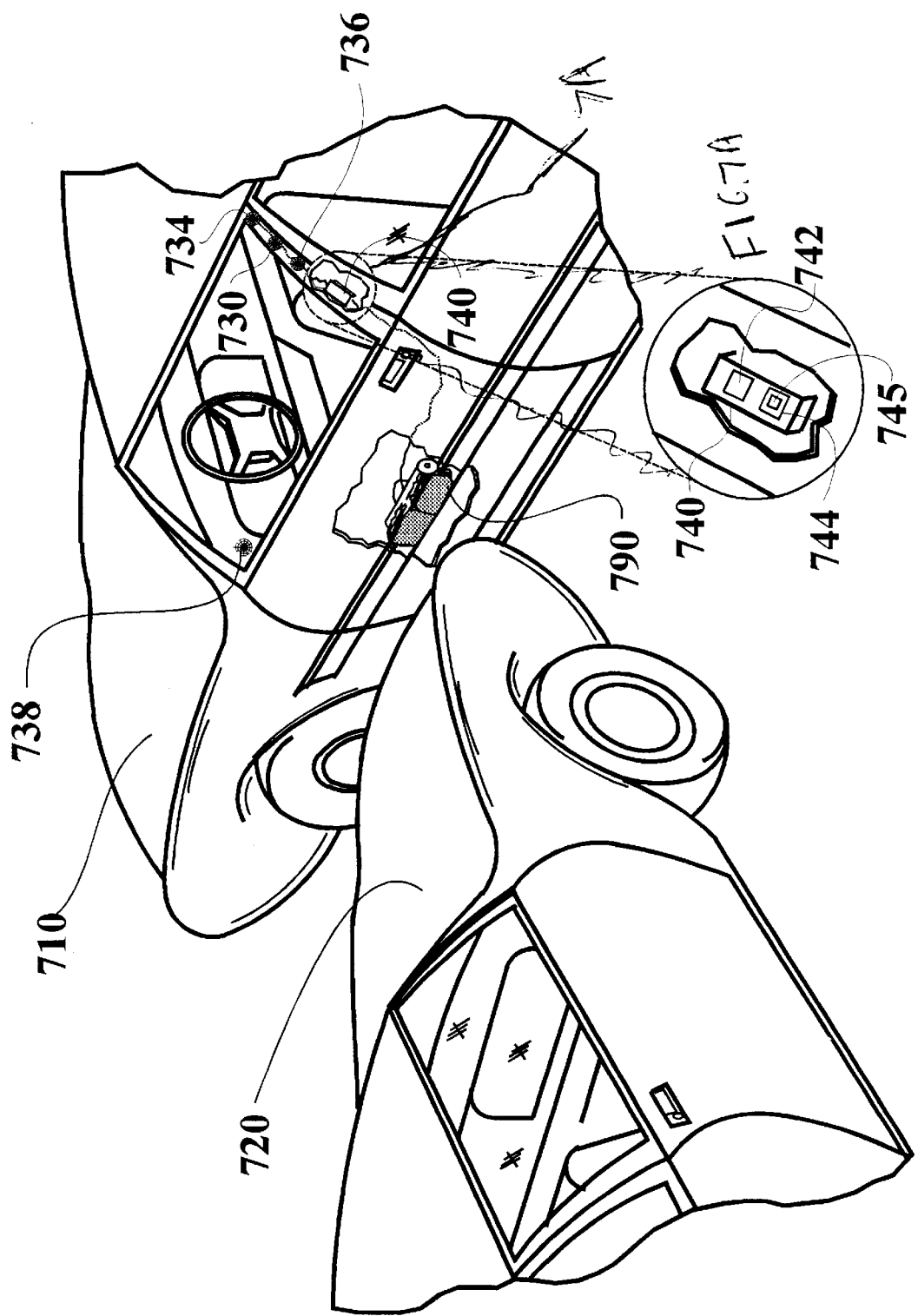
FIG. 7 is a perspective view of a vehicle about to impact the side of another vehicle showing the location of the various parts of the anticipatory sensor system of this invention.

FIG. 7 is an angular perspective overhead view of a vehicle 710 about to be impacted in the side by an approaching vehicle 720, where vehicle 710 is equipped with an anticipatory sensor system showing a transmitter 730 transmitting electromagnetic, such as infrared, waves toward vehicle 720. This is one example of many of the use of the instant invention for exterior monitoring. The transmitter 730 is connected to an electronic module 740. Module 740 contains circuitry 742 to drive transmitter 730 and circuitry 744 to process the returned signals from receivers 734 and 736 which are also coupled to module 740. Circuitry 744 contains a processor such as a neural computer 745, which performs the pattern recognition determination based on signals from receivers 734 and 736 (FIG. 7A). Receivers 734 and 736 are mounted onto the B-Pillar of the vehicle and are covered with a protective transparent cover. An alternate mounting location is shown as 738 which is in the door window trim panel where the rear view mirror (not shown) is frequently attached. One additional advantage of this system is the ability of infrared to penetrate fog and snow better than visible light which makes this technology particularly applicable for blind spot detection and anticipatory sensing applications. Although it is well known that infrared can be significantly attenuated by both fog and snow, it is less so than visual light depending on the frequency chosen. (See for example L. A. Klein, *Millimeter-Wave and Infrared Multisensor Design and Signal Processing*, Artech House, Inc, Boston 1997, ISBN 0-89006-764-3 which is included herein by reference). I The same system can also be used for the detection of objects in the blind spot of the vehicle and the image displayed for the operator to see, or a warning system activated, if the operator attempts to change lanes, for example. In this case, the mounting location must be chosen to provide a good view along the side of the vehicle in order to pick up vehicles which are about to pass vehicle 710. Each of the locations 734, 736 and 730 provide sufficient field of view for this application although the space immediately adjacent to the vehicle could be missed. Alternate locations include mounting onto the outside rear view mirror or the addition of a unit in the rear window or C-Pillar. The mirror location, however, does leave the device vulnerable to being covered with ice, snow and dirt.

In both cases of the anticipatory sensor and blind spot detector, the infrared transmitter and CCD array system provides mainly image inforniation to permit recognition of the object in the vicinity of vehicle 710. To complete the process, distance information is also require as well as velocity information, which can in general be obtained by differentiating the position data. This can be accomplished by any one of the several methods discussed above, such as with a pulsed laser radar system, as well as with a radar system.

Radar systems, which may not be acceptable for use in the interior of the vehicle, are now commonly used in sensing applications exterior to the vehicle, police radar being one well-known example. Miniature radar systems are now available which are inexpensive and fit within the available space. Such systems are disclosed in the McEwan patents described above. Another advantage of radar in this application is that it is easy to get a transmitter with a desirable divergence angle so that the device does not have to be aimed. One particularly advantageous mode of practicing the invention for these cases, therefore, is to use radar and a second advantageous mode is the pulsed laser radar system, along with a CCD array, although the use of two CCD arrays or the acoustical systems are also good choices. The acoustical system has the disadvantage of being slower than the laser radar device and must be mounted outside of the vehicle where it may be affected by the accumulation of deposits onto the active surface.

In a preferred implementation, transmitter 730 is an infrared transmitter and receivers 734, 736 and 738 are CCD transducers that receive the reflected infrared waves from vehicle 720. In the implementation shown in FIG. 7, an exterior airbag 790 is shown which deploys in the event that a side impact is about to occur as described in copending U.S. patent application Ser. No. 08/247,760 cross-referenced above.

Figure 8:
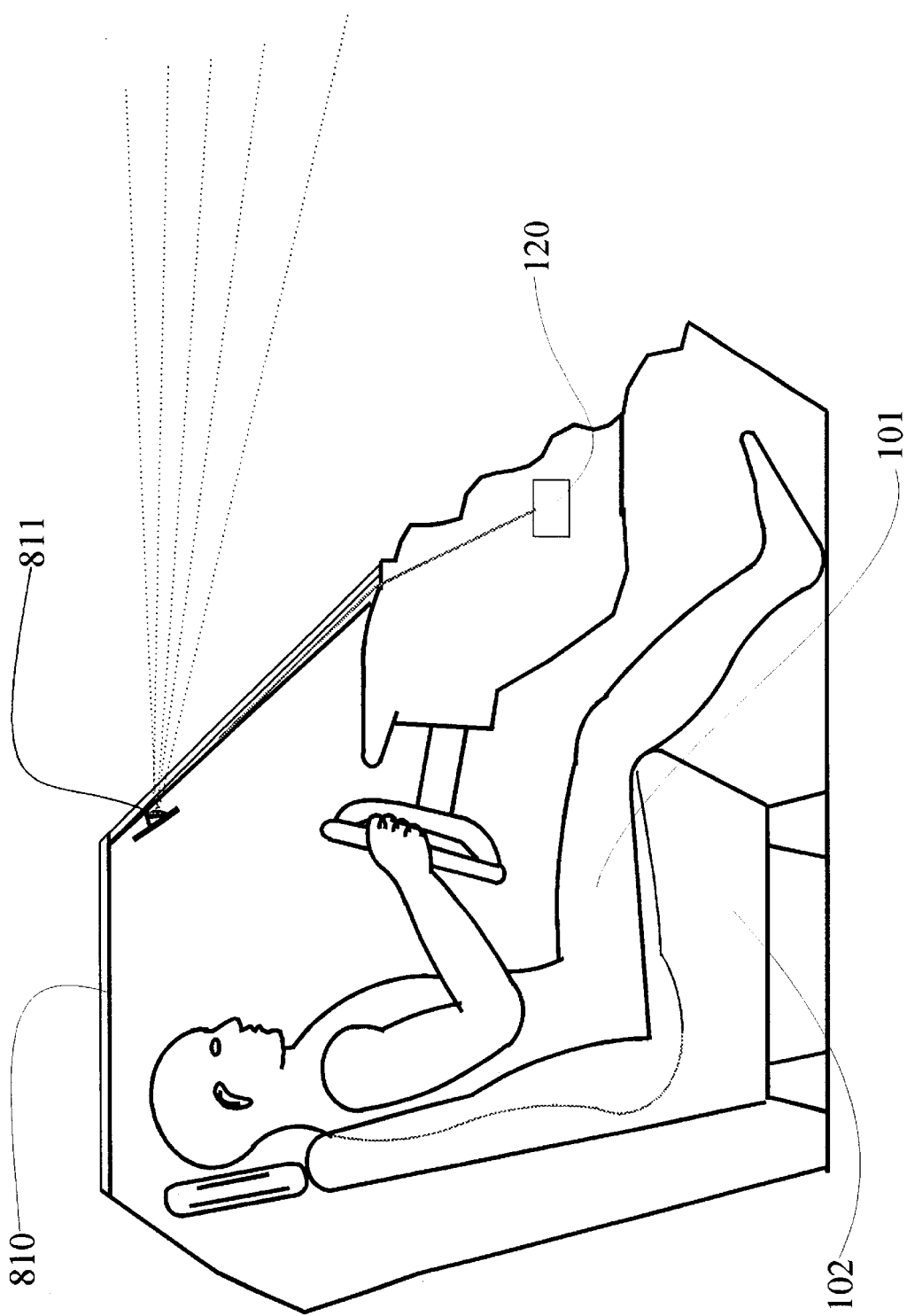
FIG. 8 is a side planar view, with certain portions removed or cut away, of a portion of the passenger compartment illustrating a sensor for sensing the headlights of an oncoming vehicle and/or the taillights of a leading vehicle used in conjunction with an automatic headlight dimming system.

FIG. 8 illustrates the exterior monitoring system for use in detecting the headlights of an oncoming vehicle or the taillights of a vehicle in front of vehicle 810. a this embodiment, the CCD array is designed to be sensitive to visible light and a separate source of illumination is not used. Once again for some applications, the key to this technology is the use of trained pattern recognition algorithms and particularly the artificial neural network. Here, as in the other cases above and in the co-pending patent applications referenced above, the pattern recognition system is trained to recognize the pattern of the headlights of an oncoming vehicle or the tail lights of a vehicle in front of vehicle 810 and to then dim the headlights when either of these conditions is sensed. It is also trained to not dim the lights for other reflections such as reflections off of a sign post or the roadway. One problem is to differentiate taillights where dimming is desired from distant headlights where dimming is not desired. Three techniques are used: (i) measurement of the spacing of the light sources, (ii) determination of the location of the light sources relative to the vehicle, and (iii) use of a red filter where the brightness of the light source through the filter is compared with the brightness of the unfiltered light. In the case of the taillight, the brightness of the red filtered and unfiltered light is nearly the same while there is a significant difference for the headlight case. In this situation, either two CCD arrays are used, one with a filter, or a filter which can be removed either electrically, such as with a liquid crystal, or mechanically.

The headlights of oncoming vehicles frequently make it difficult for the driver of a vehicle to see the road and safely operate the vehicle. This is a significant cause of accidents and much discomfort. The problem is especially severe during bad weather where rain can cause multiple reflections. Visors are now used to partially solve this problem but they do so by completely blocking the view through a large portion of the window and therefore cannot be used to cover the entire windshield. Similar problems happen when the sun is setting or rising and the driver is operating the vehicle in the direction of the sun. The vehicle interior monitoring system of this invention can contribute to the solution of this problem by determining the position of the driver's eyes as discussed above. If separate sensors are used to sense the direction of the light from the on-coming vehicle or the sun and through the use of electrochromic glass or a liquid crystal assembly, a portion of the windshield can be darkened to impose a filter between the eyes of the driver and the light source. Electrochromic glass is a material where the color of the glass can be changed through the application of an electric current. By dividing the windshield into a controlled grid or matrix of contiguous areas and through feeding the current into the windshield from orthogonal directions, selective portions of the windshield can be darkened as desired using either the electrochromic, liquid crystal or a similar technology. There are other technologies currently under development that perform in a similar manner as liquid crystals. The term "liquid crystal" as used herein, therefore, will be used to represent the class of all such materials where the optical transmissibility can be varied electrically or electronically. Electrochromic products are available from Gentex of Zeeland, Mich, and Donnelly of Holland, Mich.

FIG. 9 illustrates how such a system operates. A sensor 910 located on vehicle 902 determines the direction of the light from the headlights of oncoming vehicle 904. Sensor 910 is comprised of a lens and a CCD array with appropriate electronic circuitry which determines which elements of the CCD array are being most brightly illuminated. An algorithm stored in control circuitry 120 then calculates the direction of the light from the oncoming headlights based on the information from the CCD array. Transducers 110, 111, 113 and 114 determine the probable location of the eyes of the operator 101 of vehicle 902 in a manner such as described above. In this case, however, the determination of the probable locus of the driver's eyes is made with an accuracy of a diameter for each eye of about 3 inches (7.5 cm). This calculation sometimes will be in error and provision is made for the driver to make an adjustment to correct for this error as described below.

The windshield 916 of vehicle 902 comprises a liquid crystal, or similar technoliology, and is selectively darkened at area 918 due to the application of a current along perpendicular directions 922 and 924 of windshield 916. The particular portion of the windshield to be darkened is determined by control circuitry 120. Once the direction of the light from the oncoming vehicle is known and the locations of the driver's eyes are known, it is a matter of simple trigonometry to determine which areas of the windshield matrix should be darkened to impose a filter between the headlights and the driver's eyes. This is accomplished by control circuitry 120. A separate control system, not shown, located on the instrument panel, or at some other convenient location, allows the driver to select the amount of darkening accomplished by the system from no darkening to maximum darkening. In this manner, the driver can select the amount of light which is filtered to suit his particular physiology. The sensor 910 can either be designed to respond to a single light source or to multiple light sources to be sensed and thus multiple portions of the vehicle windshield to be darkened.

As mentioned above, the calculations of the location of the driver's eyes may be in error and therefore provision can be made to correct for this error. One such system permits the driver to adjust the center of the darkened portion of the windshield to correct for such errors through a knob on the instrument panel, steering wheel or other convenient location. Another solution permits the driver to make the adjustment by slightly moving his head. Once a calculation as to the location of the driver's eyes has been made, that calculation is not changed even though the driver moves his head slightly. It is assumed that the driver will only move his head to center the darkened portion of the windshield to optimally filter the light from the oncoming vehicle. The monitoring system will detect this initial head motion and make the correction automatically for future calculations.

In the applications discussed and illustrated above, the source and receiver of the electromagnetic radiation have been mounted in the same package. This is not necessary and in some implementations, the illumination source will be mounted elsewhere. For example, a laser beam can be used which is directed along an axis which bisects the angle between the center of the seat volume and two of the arrays. Such a beam may come from the A-Pillar, for example. The beam, which may be supplemental to the main illumination system, provides a point reflection from the occupying item that, in most cases, can been seen by two receivers. Triangulation thereafter can precisely determination the location of the illuminated point. This point can be moved to provide more information. In another case where it is desired to track the head of the occupant, for example, several such beams can be directed at the occupant's head during pre-crash braking or even during a crash to provide the fastest information as to the location of the head of the occupant for the fastest tracking of the motion of the occupant's head. Since only a few pixels are involved, even the calculation time is minimized.

In most of the applications above the assumption has been made that either a uniform field of light or a scanning spot of light will be provided. This need not be the case. The light that is emitted to illuminate the object can be structured light. Structured light can take many forms starting with, for example, a rectangular or other macroscopic pattern of light and dark can be superimposed on the light by passing it through a filter. If a similar pattern is interposed between the reflections and the camera, a sort of pseudo-interference pattern can result sometimes known as Moire patterns. A similar effect can be achieved by polarizing transinitted light so that different parts of the object that is being illuminated are illuminated with light of different polarization. Once again by viewing the reflections through a similarly polarized array, information can be obtained as to where the source of light came from which is illuminating a particular object.

The goal is to determine the direction that a particular ray of light had when it was transmitted from the source. Then by knowing which pixels were illuminated by the reflected light ray along with the geometry of the vehicle, the distance to the point of reflection off of the object can be determined. This is particularly effective if the light source is not collated with the CCD array. If a particular light ray, for example, illuminates an object surface which is near to the source then the reflection off of that surface will illuminate a pixel at a particular point on the CCD array. If the reflection of the same ray however occurs from a more distant surface, then a different pixel will be illuminated in the CCD array. In this manner the distance from the surface of the object to the CCD can be determined by triangulation formulas. Similarly if a given pixel is illuminated in the CCD from a reflection of a particular ray of light from the transmitter, and if we know the direction that that ray of light was sent from the transmitter, then the distance to the object at the point of reflection can be determined. If each ray of light is individually recognizable and therefore can be correlated to the angle at which it was transmitted, then a full three-dimensional image can be obtained of the object that simplifies the identification problem.

The coding of the light rays coming from the transmitter can be accomplished in many ways. One method is to polarize the light by passing the light through a filter whereby the polarization is a combination of the amount and angle of the polarization . This gives two dimensions that can therefore be used to fix the angle that the light was sent. Another method is to superimpose an analog or digital signal onto the light which could be done, for example, by using an addressable light valve, such as a liquid crystal filter, electrochromic filter, or, preferably, a garnet crystal array. Each pixel in this array would be coded such that it could be identified at the CCD.

The technique described above is dependent upon either changing the polarization or using the time domain to identify particular transmission angles with particular reflections. Spatial patterns can also be imposed on the transmitted light which generally goes under the heading of structured light. The concept is that if a pattern is identifiable then either the direction of transmitted light can be determined or, if the transmission source is collated with the receiver, then the pattern expands as it travels toward the object and then, by determining the size of the received pattern, the distance to the object can be determined. In some cases Moire pattern techniques are utilized.

When the illumination source is not placed at the same location as the receiving array, it is typically placed at an angle such as 45 degrees. At least two other techniques can be considered. One is to place the illumination source at 90 degrees to the CCD array. In this case only those surface elements that are closer to the receiving array then previous surfaces are illuminated. Thus significant infonration can be obtained as to the profile of the object. In fact, if no object is occupying the seat, then there will be no reflections except from the seat itself. This provides a very powerful technique for determining whether the seat is occupied and where the initial surfaces of the occupying item are located.

The particular radiation field of the transmitting transducer can also be important to some implementations of this invention. In some techniques the object which is occupying the seat is the only part of the vehicle which is illuminated. Extreme care is exercised in shaping the field of light such that this is true. For example, the objects are illuminated in such a way that reflections from the door panel do not occur. Ideally if only the items which occupy the seat can be illuminated then the problem of separating the occupant from the interior vehicle passenger compartment surfaces can be more easily accomplished.

Another variant on the invention is to use no illumination source at all. In this case, the entire visible and infrared spectrum will be used. CMOS arrays are now available with very good night vision capabilities making it possible to see and image an occupant in very low light conditions.

A further consideration to this invention is to use the motion of the occupant, as determined from successive differential arrays, for example, to help identify that there is in fact a living object occupying the seat, or for other purposes.

There has thus been shown and described a monitoring system for monitoring both the interior and the exterior of the vehicle using an optical system with one or more CCD arrays and other associated equipment which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

We claim:

1. A method for determining the identification and position of objects in a passenger compartment of a vehicle, comprising the steps of:

storing a derivation of images of the passenger compartment taken from a plurality of specific locations with different objects in various positions in the passenger compartment in association with data relating to the identification of the objects and the position of the objects relative to the passenger compartment, transmitting electromagnetic waves into the passenger compartment, obtaining a plurality of images of the interior of the passenger compartment from the specific locations, and comparing a derivation of the obtained images of the interior of the passenger compartment with the stored derivation of images to obtain the associated data relating to the identification and position of the objects of the image of the stored derivation to which the obtained images of the interior of the passenger compartment match most closely.

2. The method of claim 1, wherein the electromagnetic waves are transmitted from transmitter/receiver assemblies, further comprising the step of:
positioning the assemblies at different locations around a seat of the vehicle such that each of the assemblies is situated in a middle of a side of the ceiling surrounding the seat.

3. The method of claim 1, further comprising the step of:
obtaining, the derivation of the obtained images of the interior of the passenger compartment by
comparing the obtained images with a series of stored images representing different unoccupied states of the passenger compartment and
subtracting each of the stored images representing unoccupied states of the passenger compartment from the obtained images.

4. The method of claim 1, wherein the step of comparing the derivation of the obtained images of the interior of the passenger compartment with stored derivation of images comprises the steps of:
analyzing the total number of pixels in each obtained image reduced below a threshold level, and
analyzing the minimum number of remaining detached pixels.

5. The method of claim 1, wherein the electromagnetic waves are transmitted from transmitter/receiver assemblies, each of the assemblies comprising an optical transmitter selected from a group consisting of an infrared LED, an infrared LED with a diverging lens, a laser with a diverging lens and a scanning laser assembly, and an optical array selected from a group consisting of a CCD array and a CMOS array, the optical array being arranged to obtain the images of the interior of the passenger compartment.

6. The method of claim 5, further comprising the step of:
obtaining the derivation of the obtained images of the interior of the passenger compartment by
comparing the images obtained by each array with a series of stored arrays representing different unoccupied states of the passenger compartment, and
subtracting each of the stored arrays from the images obtained by each array.

7. The method of claim 5, wherein the step of comparing the derivation of the obtained images of the interior of the passenger compartment with stored derivation of images comprises the steps of:
analyzing the total number of pixels in each image reduced below a threshold level, and
analyzing the minimum number of remaining detached pixels.

8. The method of claim 1, further comprising the steps of:
generating a library of images of the passenger compartment with different objects in various positions by
positioning an object on the seat,
transmitting electromagnetic waves into the passenger compartment from the locations,
obtaining images of the interior of the passenger compartment, each from a respective location,
associating the images with the identification and position of the object, and
repeating the positioning step, transmitting step, image obtaining step and associating step for the same object in different positions and for different objects in different positions.

9. The method of claim 1, wherein the objects includes a steering wheel, a seat and a headrest such that at least one of the angle of the steering wheel, the telescoping position of the steering wheel, the angle of the back of the seat, the position of the headrest and the position of the seat are obtained.

10. The method of claim 1, flirter comprising the step of:
after the identification and position of the objects are obtained, affecting another system in the vehicle based on the obtained identification and position of at least one of the objects.

11. The method of claim 1, wherein the stored derivation of images is a neural network, further comprising the step of:
training the neural network on the images of the interior of the passenger compartment with different objects in various positions and the associated data relating to the identification and position of the objects in the images in order to enable the neural network to provide an index of a image on which the neural network is trained that most closely matches an input image or a form thereof,
the step of comparing the derivation of the obtained images of the interior of the passenger compartment with stored derivation of images comprising the step of inputting the derivation of the obtained images or a form thereof into all the neural network which provides for each obtained image of the interior of the passenger compartment, an index of an image on which the neural network is trained that most closely matches the obtained image of the interior of the passenger compartment.

12. The method of claim 11, wherein one of the objects is a person, further comprising the step of:
utilizing the index to locate stored information from the matched image including at least one of a locus of a point representative of the position of the chest of the person, a locus of a point representative of the position of the head of the person, one or both ears of the person, one or both eyes of the person and the mouth of the person.

13. The method of claim 12, further comprising the steps of:
determining the position of the person relative to at least one airbag of the vehicle, and
controlling deployment of the at least one airbag based on the determined position of the person.

14. The method of claim 12, wherein information about the location of the eyes of the person is obtained, further comprising the step of:
adjusting the position of at least one of the car view mirrors based on the location of the eyes of the person.

15. The method of claim 12, wherein information about the location of the eyes of the person is obtained, further comprising the step of:
darkening the windshield of the vehicle at selective locations based on the location of the eyes of the person.

16. The method of claim 12, wherein information about the location of the ears of the person is obtained, further comprising the step of:
controlling audio waves in the vehicle based on the location of the ears of the person.

17. The method of claim 12, further comprising the steps of:
monitoring the location of the locus of a point representative of the position of the chest or head of the person over time, and controlling another system in the vehicle based on changes in the location of the locus of a point representative of the position of the chest or head over time.

18. The method of claim 17, wherein the step of monitoring the location of the locus of a point representative of the position of the chest or head over time comprises the steps of subtracting a most recently obtained image from an immediately preceding image and analyzing a leading edge of changes in the images.

19. The method of claim 17, wherein the step of monitoring the location of the locus of a point representative of the position of the chest or head over time comprises the steps of deriving a correlation function which correlates the images with the chest or head in an initial position with the most recently obtained images.

20. The method of claim 1, further comprising the step of:
transmitting the waves through a diverging lens.

21. The method of claim 1, further comprising the steps of:
measuring the weight applied onto the seat, and
affecting another system in the vehicle based on the measured weight applied onto the seat and the identification and position of the objects in the passenger compartment.

22. A method for determining the identification and position of objects in a passenger compartment of a vehicle, comprising the steps of:
transmitting electromagnetic waves into the passenger compartment from at least one location,
obtaining a plurality of images of the interior of the passenger compartment from a plurality of locations,
creating a three-dimensional representation of the interior of the passenger compartment from the images, and
applying a pattern recognition technique to the representation in order to determine the identification and position of the objects in the passenger compartment.

23. The method of claim 22, wherein the step of applying a pattern recognition technique to the representation comprises the steps of conducting a training stage in which a neural network is trained on representations of the interior of the passenger compartments from images of different objects in various positions and associated data relating at least to the identification and position of the objects in the images.

24. The method of claim 22, wherein the pattern recognition technique comprises fuzzy logic.

25. The method of claim 22, wherein the step of obtaining the images comprises the steps of operating a laser in a pulse mode, scanning the interior of the passenger compartment by moving the laser and determining the distance from the object being illuminated using range gating.

26. A method for tracking motion of a vehicular occupant's head or chest, comprising the steps of:
transmitting electromagnetic waves toward the occupant from at least one location,
obtaining a first image of the interior of the passenger compartment from at least one location, the first image being represented by a matrix of pixels,
transmitting electromagnetic waves toward the occupant from the at least one location at a subsequent time,
after a discrete period of time, obtaining an additional image of the interior of the passenger compartment from each of the at least one location, the additional image being represented by a matrix of pixels,
comparing the additional image to the first image obtained at the same location to determine which pixels have changed in value,
determining a leading edge of the changed pixels and a width of a field of the changed pixels to thereby determine movement of the occupant from the time between which the first and additional images were taken, and
replacing the first image with the additional image and repeating the steps of obtaining an additional image after a discrete period of time and comparing the additional image to the first image such that progressive motion of the occupant is attained.

27. A method for controlling deployment of an occupant restraint system in a vehicle, comprising the steps of:
storing a derivation of images of the interior of the passenger compartment with occupants in various positions in association with data relating to the distance between the occupant and the occupant restraint system for each image,
transmitting electromagnetic waves toward an occupant seated in a passenger compartment of the vehicle from at least one location,
obtaining a plurality of images of the interior of the passenger compartment from a plurality of locations,
analyzing the obtained images to determine the distance between the occupant and the occupant restraint system, the step of analyzing the images comprises the step of comparing a derivation of the images of the interior of the passenger compartment with the stored derivation of images to obtain the associated data relating to the distance between the occupant and the occupant restraint system of the image of the stored derivation to which the obtained images of the interior of the passenger compartment match most closely, and
controlling deployment of the occupant restraint system based on the determined distance between the occupant and the occupant restraint system.

28. The method of claim 27, wherein the stored derivation of images is a neural network, further comprising the step of:
training the neural network on the images of the interior of the passenger compartment with occupants in various positions and the associated data relating at least to the distance between the occupant and the occupant restraint system in order to enable the neural network to provide an index of an image on which the neural network is trained that most closely matches an input image or a form thereof,
the step of comparing the derivation of the obtained images of the interior of the passenger compartment with the stored derivation of images comprising the step of inputting the derivation of the obtained images or a form thereof into the neural network which provides for each obtained image of the interior of the passenger compartment, an index of an image on which the neural network is trained that most closely matches the obtained image of the interior of the passenger compartment.

29. The method of claim 27, further comprising the steps of:
measuring the weight of the occupant on a seat, and
controlling deployment of the occupant restraint system based on the determined distance between the occupant and the occupant restraint system and the measured weight of the occupant.

30. A method for determining the identification and position of objects in a passenger compartment of a vehicle, comprising the steps of:

storing a derivation of images of radiation emanating from different objects in various positions in the passenger compartment taken from a plurality of specific locations in association with data relating to the identification of the objects and the position of the objects relative to the passenger compartment, obtaining a plurality of images of the interior of the passenger compartment, each from a respective one of the specific locations and of radiation emanating from the objects in the passenger compartment, and comparing a derivation of the obtained images of the radiation emanating from the objects in the passenger compartment with the stored derivation of images of radiation emanating from different objects in the passenger compartment to obtain the associated data relating to the identification and position of the object of the image of the stored derivation to which the obtained images of the interior of the passenger compartment match most closely.

31. The method of claim 30, wherein the plurality of images are obtained on at least one optical array selected from a group consisting of a CCD array and a CMOS array.

32. The method of claim 30, further comprising the steps of:

generating a library of images of the passenger compartment with different objects in various positions by positioning an object on the seat, obtaining images of radiation emanating from the object, associating the images with the identification and position of the object, and repeating the positioning step, image obtaining step and associating step for the same object in different positions and for different objects in different positions.

33. The method of claim 30, further comprising the step of:

after the identification and position of the objects are obtained, affecting another system in the vehicle based on the obtained identification and position of at least one of the objects.

34. The method of claim 30, wherein the stored derivation of images is a neural network, further comprising the step of:

training the neural network on the images of radiation emanating from objects in the passenger compartment with different objects in various positions and associated data relating to the identification and position of the objects in the images in order to enable the neural network to provide an index of an image on which the neural network is trained that most closely matches an input image or a form thereof, the step of comparing the derivation of the obtained images of the radiation emanating from the objects in the passenger compartment with the stored derivation of images comprising the step of inputting the derivation of the obtained images or a form thereof into the neural network which provides for each image of the radiation emanating from the objects in the passenger compartment, an index of an image on which the neural network is trained that most closely matches the obtained image of the interior of the passenger compartment.

35. The method of claim 34, wherein one of the objects is a person, further comprising the step of:

utilizing the index to locate stored information from the matched image including at least one of a locus of a point representative of the position of the chest of the person, a locus of a point representative of the position of the head of the person, one or both ears of the person, one or both eyes of the person and the mouth of the person.

36. The method of claim 35, further comprising the steps of:

determining the position of the person relative to at least one airbag of the vehicle, and controlling deployment of the at least one airbag based on the determined position of the person.

37. The method of claim 35, wherein information about the location of the eyes of the person is obtained, further comprising the step of:

adjusting the position of at least one of the rear view mirrors based on the location of the eyes of the person.

38. The method of claim 35, wherein information about the location of the eyes of the person is obtained, further comprising the step of:

darkening the windshield of the vehicle at selective locations based on the location of the eyes of the person.

39. The method of claim 35, wherein information about the location of the ears of the person is obtained, further comprising the step of:

controlling audio waves in the vehicle based on the location of the ears of the person.

40. The method of claim 35, further comprising the steps of:

monitoring the location of the locus of a point representative of the position of the chest or head of the person over time, and controlling another system in the vehicle based on changes in the location of the locus of a point representative of the position of the chest or head over time.

41. The method of claim 35, wherein information about the location of the mouth of the person is obtained, further comprising the step of:

directing a directional microphone in the vehicle based on the location the mouth of the person.

42. The method of claim 30, further comprising the steps of:

measuring the weight applied onto the seat, and affecting another system in the vehicle based on the measured weight applied onto the seat and the identification and position of the objects in the passenger compartment.

* * * * *